(12) United States Patent
Goldstein

(10) Patent No.: US 6,286,332 B1
(45) Date of Patent: Sep. 11, 2001

(54) ICE-MAKING MACHINE AND HEAT EXCHANGER THEREFOR

(75) Inventor: Vladimir Goldstein, King (CA)

(73) Assignee: Sunwell Engineering Company Limited, Ontario (CA)

( * ) Notice: Subject to any disclaimer, the term of this patent is extended or adjusted under 35 U.S.C. 154(b) by 0 days.

(21) Appl. No.: 09/490,892

(22) Filed: Jan. 27, 2000

Related U.S. Application Data

(60) Continuation of application No. 09/134,834, filed on Aug. 17, 1998, now Pat. No. 6,056,046, which is a division of application No. 08/633,704, filed on Apr. 19, 1996, now Pat. No. 5,884,501.

(51) Int. Cl.$^7$ ........................................... A23G 9/16
(52) U.S. Cl. ............................... 62/342; 165/133
(58) Field of Search ..................... 62/342; 165/133

(56) References Cited

U.S. PATENT DOCUMENTS

| | | | |
|---|---|---|---|
| 3,145,017 | * | 8/1964 | Thomas .................................. 62/343 |
| 3,255,815 | * | 6/1966 | Smith ..................................... 366/147 |
| 3,328,972 | * | 7/1967 | Svanoe ................................... 62/123 |
| 3,534,563 | * | 10/1970 | Ross ........................................ 62/354 |
| 4,159,740 | * | 7/1979 | Seiling ................................... 165/147 |
| 4,250,718 | * | 2/1981 | Brantley ................................. 62/354 |
| 4,546,819 | * | 10/1985 | O'Connor .............................. 165/70 |
| 4,682,475 | * | 7/1987 | Nelson ................................... 62/354 |
| 4,738,310 | * | 4/1988 | Luttenberger et al. .............. 165/158 |
| 4,787,441 | * | 11/1988 | Granryd et al. ...................... 165/133 |
| 4,796,441 | * | 1/1989 | Goldstein .............................. 62/354 |
| 4,827,734 | * | 5/1989 | Buus ..................................... 165/133 |
| 5,099,913 | * | 3/1992 | Kadle ................................... 165/147 |
| 5,312,184 | * | 5/1994 | Cocchi ................................. 366/302 |
| 5,419,150 | * | 5/1995 | Kaiser et al. ......................... 62/342 |
| 5,431,027 | * | 7/1995 | Carpenter ............................ 62/354 |
| 5,488,836 | * | 2/1996 | Laude-Bousquet ................. 62/532 |
| 5,518,066 | * | 5/1996 | Francis et al. ...................... 165/133 |

FOREIGN PATENT DOCUMENTS

| | | | |
|---|---|---|---|
| 0641980 | * | 3/1995 | (EP) . |
| 2232469 | * | 12/1990 | (GB) . |

* cited by examiner

*Primary Examiner*—William E. Tapolcai
(74) *Attorney, Agent, or Firm*—Connolly Bove Lodge & Hutz LLP

(57) ABSTRACT

An ice-making machine comprises a heat exchanger including a generally cylindrical, tubular body defining a generally cylindrical internal surface. The body is formed of corrodible material and has at least one refrigerant passage extending therethrough. End plates are provided at opposite ends of the body. A refrigerant inlet delivers refrigerant to the at least one refrigerant passage and a refrigerant outlet collects refrigerant having passed through the at least one refrigerant passage. An inlet delivers fluid from which ice is to be made into the body to permit the refrigerant to extract heat from the fluid and an outlet permits the egress of ice from the body. A cylindrical sleeve lines the internal surface and is formed from generally non-corrodable material. At least one blade is in contact with the sleeve and is movable about an axis to move across the sleeve and remove cooled fluid therefrom. A drive moves the at least one blade across the

10 Claims, 27 Drawing Sheets

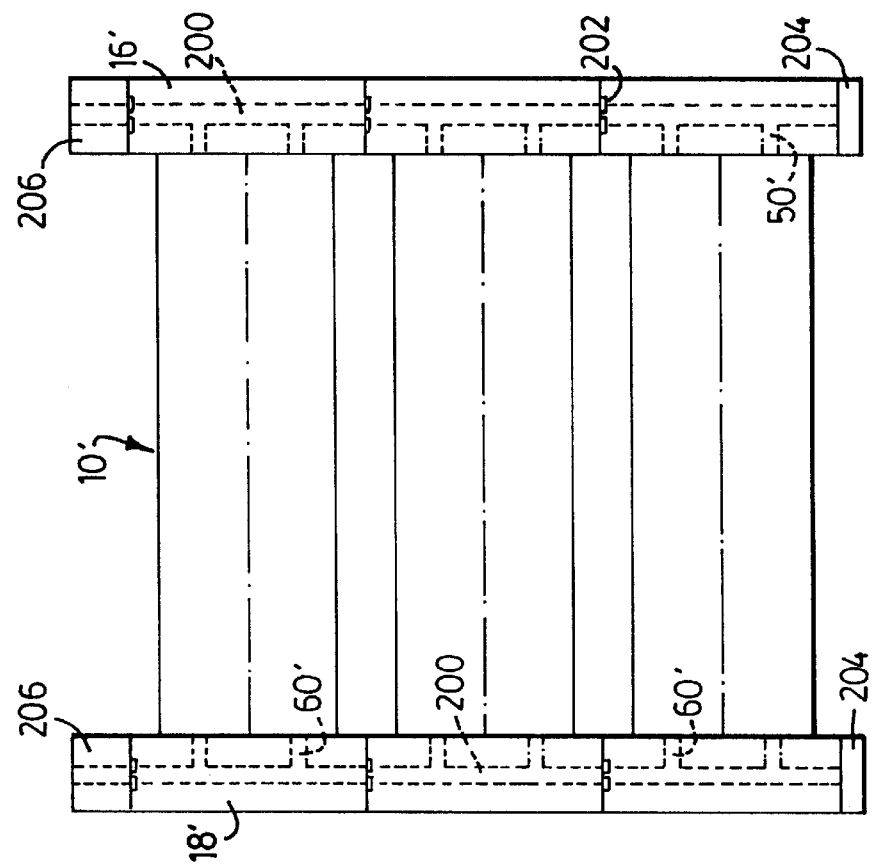
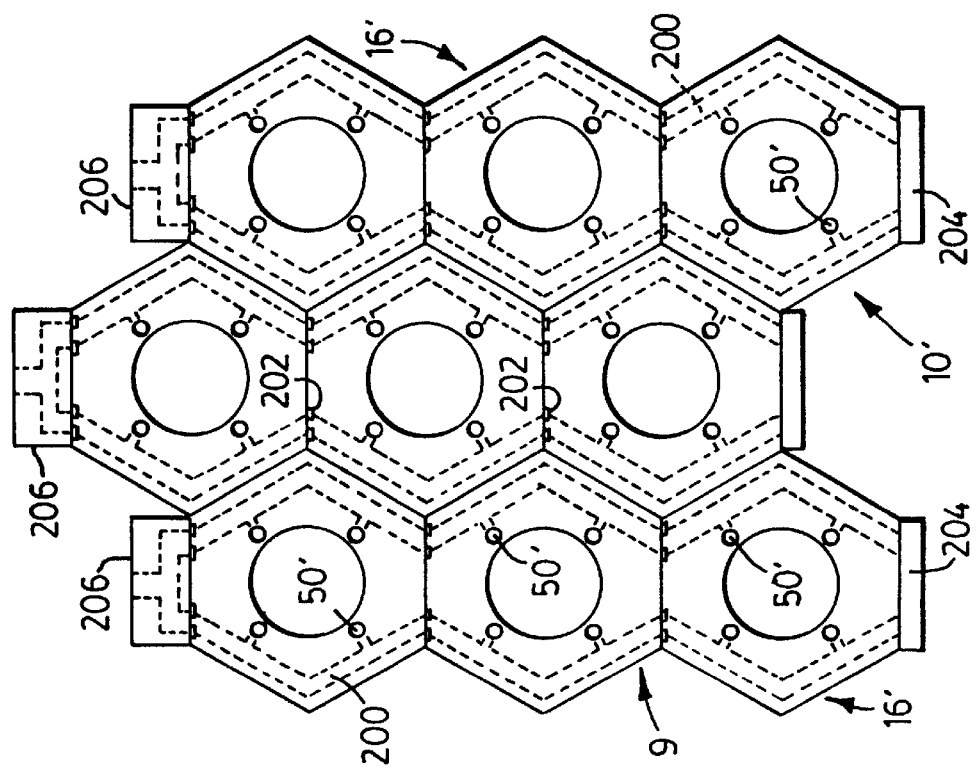

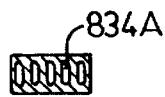
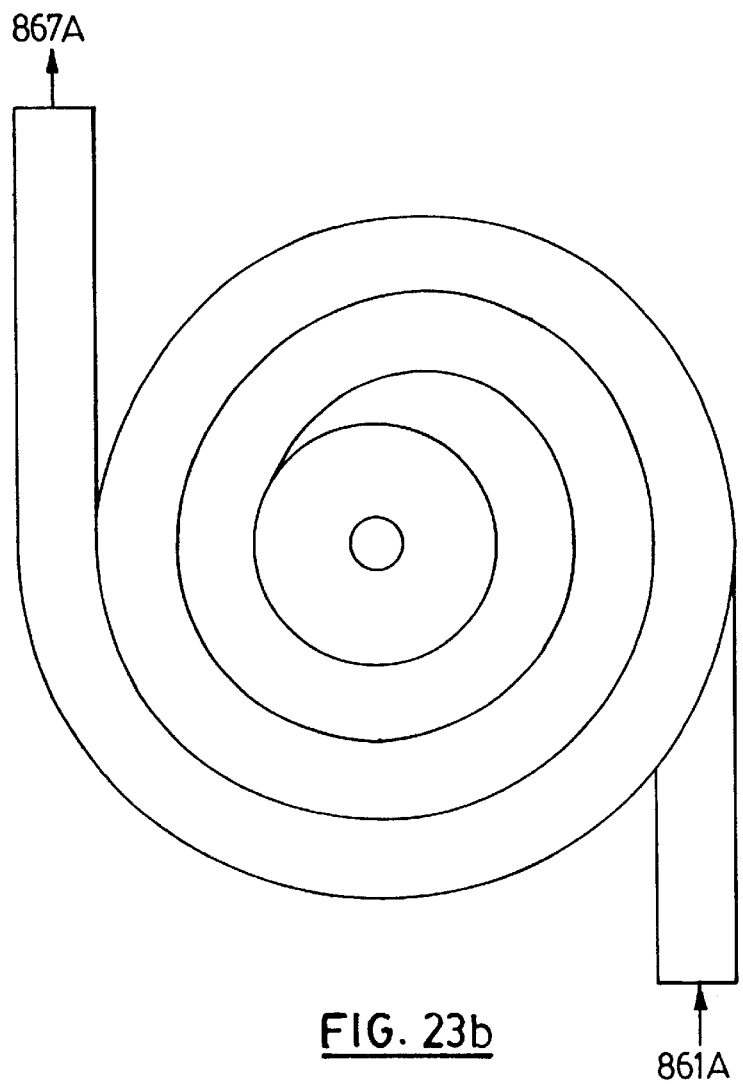
FIG. 23b
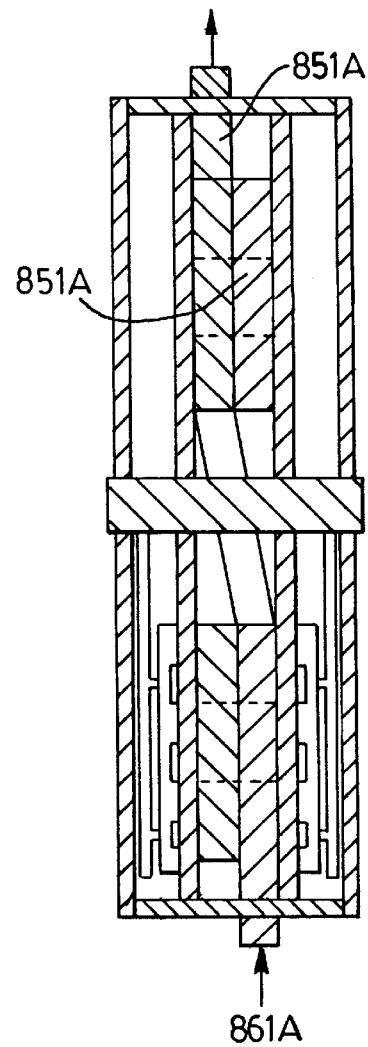
FIG. 23a

ICE-MAKING MACHINE AND HEAT EXCHANGER THEREFOR

CROSS-RELATED APPLICATIONS

The present application is a continuation application of U.S. application Ser. No. 09/134,834 filed on Aug. 17, 1998 now U.S. Pat. No. 6,056,046, which is a divisional application of U.S. application Ser. No. 08/633,704 filed on Apr. 19, 1996, now issued under U.S. Pat. No. 5,884,501.

FIELD OF THE INVENTION

The present invention relates to ice-making machines and in particular to an ice-making machine having a heat exchanger body with integrally formed refrigerant passages therein and to a heat exchanger therefore.

BACKGROUND OF THE INVENTION

Ice-making machines are well known in the art and many designs have been considered. For example, Applicant's U.S. Pat. No. 4,796,441 issued on Jan. 10, 1989 discloses an ice-making machine having a chamber with a fluid inlet to receive a brine solution from which ice is to be made and a fluid outlet to permit the egress of an ice-brine slurry from the housing. The interior surface of the chamber defines a heat exchange surface. A blade assembly is mounted on a rotatable shaft extending through the center of the chamber. The blade assembly is in contact with the heat exchange surface. A motor rotates the shaft at a rate such that the interval between successive passes of the blade assembly over the heat exchange surface is such so as to inhibit the formation of ice crystals on the heat exchange surface.

A tubular jacket surrounds the chamber. A refrigerant inlet and a refrigerant outlet communicate with the space between the jacket and chamber and are positioned at opposed ends of the ice-making machine. Refrigerant flowing from the inlet to the outlet boils and in so doing, cools the brine solution in contact with the heat exchange surface. Refrigerant leaving the ice-making machine via the outlet is compressed before being fed back to the inlet. Rings are welded to the jacket at laterally spaced locations to provide structural stability to the ice-making machine allowing it to withstand internal pressures. Although this ice-making machine works satisfactorily, it is time consuming and expensive to manufacture.

It is therefore an object of the present invention to provide a novel ice-making machine and a heat exchanger therefore.

SUMMARY OF THE INVENTION

According to one aspect of the present invention there is provided an ice-making machine comprising:
  a heat exchanger including a generally cylindrical, tubular body and having a generally cylindrical internal heat exchange surface, said body being formed of corrodable material and having at least one refrigerant passage extending therethrough;
  end plates at opposite ends of said body;
  a refrigerant inlet to deliver refrigerant to said at least one refrigerant passage;
  a refrigerant outlet to collect refrigerant having passed through said at least one refrigerant passage;
  an inlet to deliver fluid from which ice is to be made into said body to permit said refrigerant to extract heat from said fluid;
  an outlet to permit the egress of ice from said body;
  a cylindrical sleeve lining the interior of said body and defining said heat exchange surface and being formed from generally non-corrodable material;
  at least one blade in contact with said sleeve and movable about an axis to move across said sleeve and remove cooled fluid therefrom; and
  a drive to move said at least one blade across said sleeve.

According to another aspect of the present invention there is provided an ice-making machine comprising:
  a heat exchanger including a generally cylindrical, tubular body and having a generally cylindrical internal heat exchange surface, said body having at least one refrigerant passage extending therethrough and being constituted by a plurality of arcuate segments;
  end plates at opposite ends of said body;
  a refrigerant inlet to deliver refrigerant to said at least one refrigerant passage;
  a refrigerant outlet to collect refrigerant having passed through said at least one refrigerant passage;
  an inlet to deliver fluid from which ice is to be made into said body to permit said refrigerant to extract heat from said fluid;
  an outlet to permit the egress of ice from said body;
  at least one blade in contact with said surface and movable about an axis to move across said surface and remove cooled fluid therefrom; and
  a drive to move said at least one blade across said surface.

According to still yet another aspect of the present invention there is provided an ice-making machine comprising:
  a heat exchanger including a generally cylindrical, tubular body and having a generally cylindrical internal heat exchange surface, said body having at least one refrigerant passage extending therethrough;
  end plates at opposite ends of said body, each of said end plates including an outer metal flange and an inner plastic insert;
  a refrigerant inlet to deliver refrigerant to said at least one refrigerant passage;
  a refrigerant outlet to collect refrigerant having passed through said at least one refrigerant passage;
  an inlet to deliver fluid from which ice is to be made into said body to permit said refrigerant to extract heat from said fluid;
  an outlet to permit the egress of ice from said body;
  at least one blade in contact with said surface and movable about an axis to move across said surface and remove cooled fluid therefrom; and
  a drive accommodated by said inserts to move said at least one blade across said surface.

According to still yet another aspect of the present invention there is provided an ice-making machine comprising:
  a heat exchanger including a generally cylindrical, tubular body and having a generally cylindrical internal heat exchange surface, said body having a plurality of longitudinally extending refrigerant passages extending therethrough;
  end plates at opposite ends of said body;
  a refrigerant inlet receiving refrigerant and including refrigerant tracks adjacent one end of said body to deliver refrigerant to selected ones of said refrigerant passages;
  refrigerant interconnects adjacent an opposite end of said body, said interconnects connecting said selected ones of said refrigerant passages to selected others of said refrigerant passages;

a refrigerant outlet collecting refrigerant from said selected others of said refrigerant passages;

an inlet to deliver fluid from which ice is to be made into said body to permit said refrigerant to extract heat from said fluid;

an outlet to permit the egress of ice from said body;

at least one blade in contact with said surface and movable about an axis to move across said surface and remove cooled fluid therefrom; and a drive accommodated by said end plates to move said at least one blade across said surface.

According to still yet another aspect of the present invention there is provided an ice-making system comprising:

a plurality of ice-making machines arranged in an array, each of said ice-making machines including:

a heat exchanger including a generally cylindrical, tubular body and having a generally cylindrical internal heat exchange surface, said body having at least one refrigerant passage extending therethrough;

end plates at opposite ends of said body, each of said end plates including an outer metal flange and an inner plastic insert;

a refrigerant inlet to deliver refrigerant to said at least one refrigerant passage;

a refrigerant outlet to collect refrigerant having passed through said at least one refrigerant passage;

an inlet to deliver fluid from which ice is to be made into said body to permit said refrigerant to extract heat from said fluid;

an outlet to permit the egress of ice from said body;

at least one blade in contact with said surface and movable about an axis to move across said surface and remove cooled fluid therefrom; and a drive accommodated by said inserts to move said at least one blade across said surface;

a connector coupling the refrigerant inlets of each of said ice-making machines, said connector including an inlet receiving refrigerant from a refrigerant source and delivering said refrigerant to each of said refrigerant inlets; and a collector coupling the refrigerant outlets of each of said ice-making machines and having an outlet to return refrigerant to said source.

BRIEF DESCRIPTION OF THE DRAWINGS

Embodiments of the present invention will now be described more fully with reference to the accompanying drawings in which:

FIG. 8 is a front elevational view of a plurality of stacked ice-making machines in accordance with the present invention;

FIG. 9 is a side elevational view of the stacked ice-making machines of FIG. 8 taken in the direction of FIG. 8;

FIG. 11b is an enlarged portion of FIG. 11a;

FIG. 12b is an enlarged portion of FIG. 12a;

FIG. 13b is an enlarged portion of FIG. 13a;

FIG. 13c is another enlarged portion of FIG. 13a;

FIG. 14b is an enlarged portion of FIG. 14a;

FIG. 15b is an enlarged portion of FIG. 15a;

FIG. 16b is a cross-sectional view of a bottom end plate forming part of the ice-making machine of FIG. 16a;

FIG. 21b is a side-elevational view of the ice-making machine of FIG. 21a;

FIG. 22b is a front elevational view of a heat exchanger body forming part of the ice-making machine of FIG. 22a;

FIG. 23a is a cross-sectional view of yet another embodiment of an ice-making machine in accordance with the present invention;

FIG. 23b is a front elevational view of a heat exchanger body forming part of the ice-making machine of FIG. 23a;

FIG. 24a is a front elevational view, partly in section, of yet another embodiment of an ice-making machine in accordance with the present invention;

FIG. 24b is an enlarged cross-sectional view of a portion of the ice-making machine of FIG. 24a;

FIG. 24c is a top plan view of a heat exchanger body forming part of the ice-making machine of FIG. 24a;

FIG. 25b is a cross-sectional view of an ice-making machine embodying the blade assembly of FIG. 25a;

FIG. 26b is an enlarged portion of FIG. 26a; and

FIG. 26c is a top plan cross-sectional view of the ice-making machine of FIG. 26a.

DESCRIPTION OF THE PREFERRED EMBODIMENT

Figure 1:
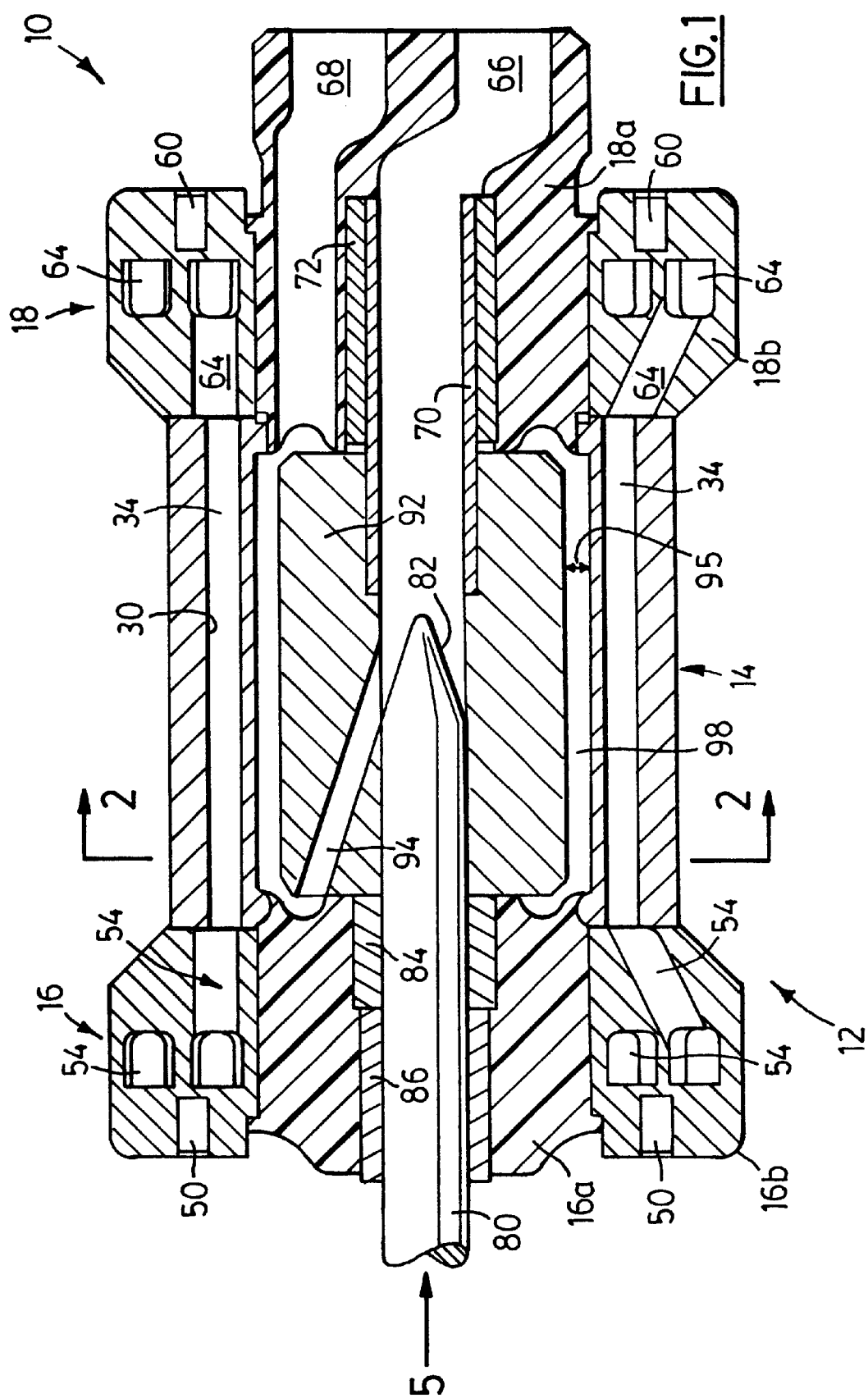
FIG. 1 is a cross-sectional view of an ice-making machine in accordance with the present invention.
Figure 3:
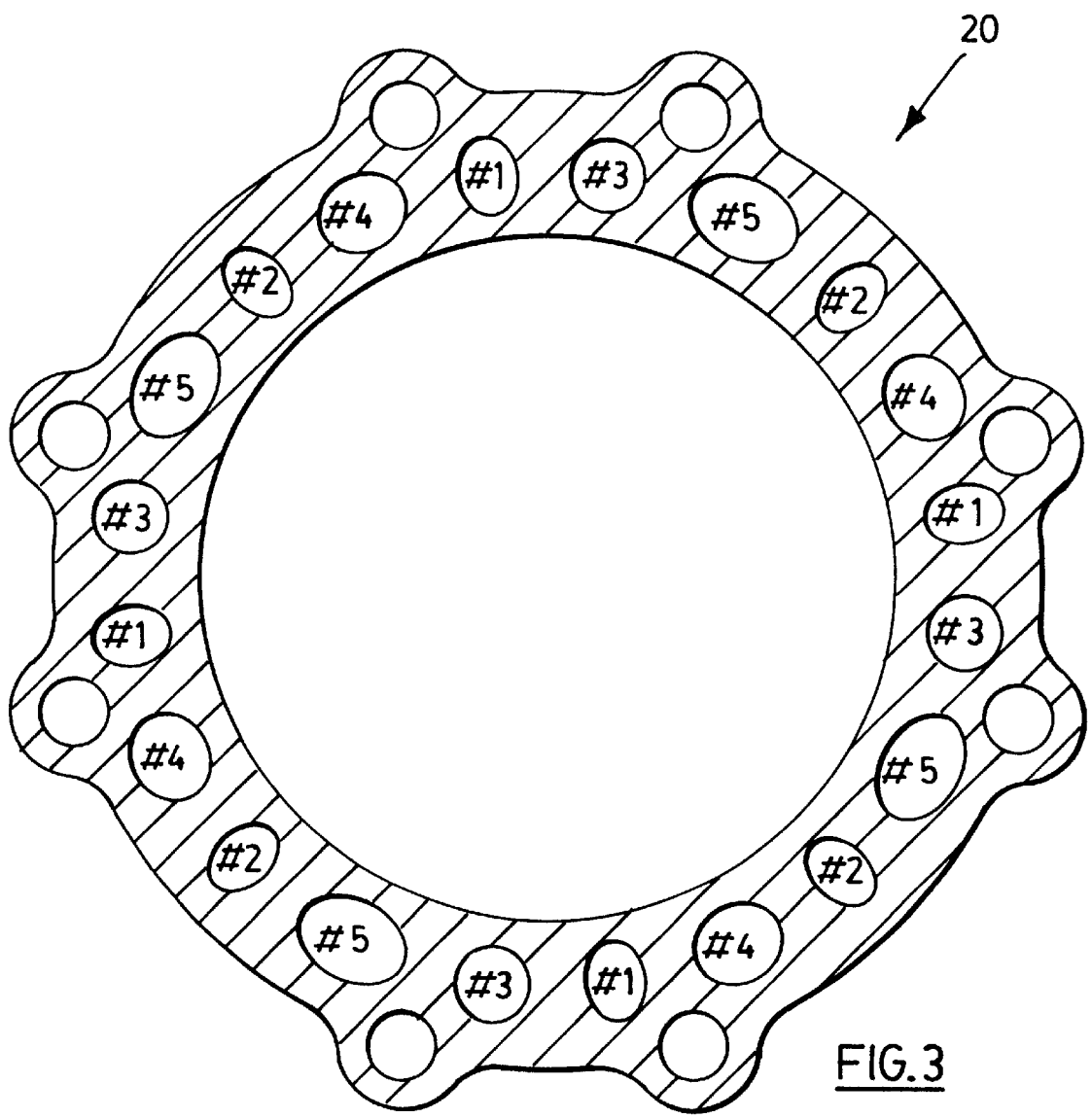
FIG. 3 is an end view of a gasket forming part of the ice-making machine of FIG. 1.

Referring now to FIG. 1, an ice-making machine is shown and is generally indicated to by reference numeral 10. As can be seen, ice-making machine 10 includes a generally cylindrical housing 12 constituted by a cylindrical central heat exchanger body 14 and a pair of end plates 16 and 18 respectively secured to the ends of the heat exchanger body 14 by suitable fasteners (not shown). Gaskets 20 (best seen in FIG. 3) are positioned between the end plates 16 and 18 and the heat exchanger body 14 to seal the housing 12 and inhibit fluid leakage.

Figure 2:
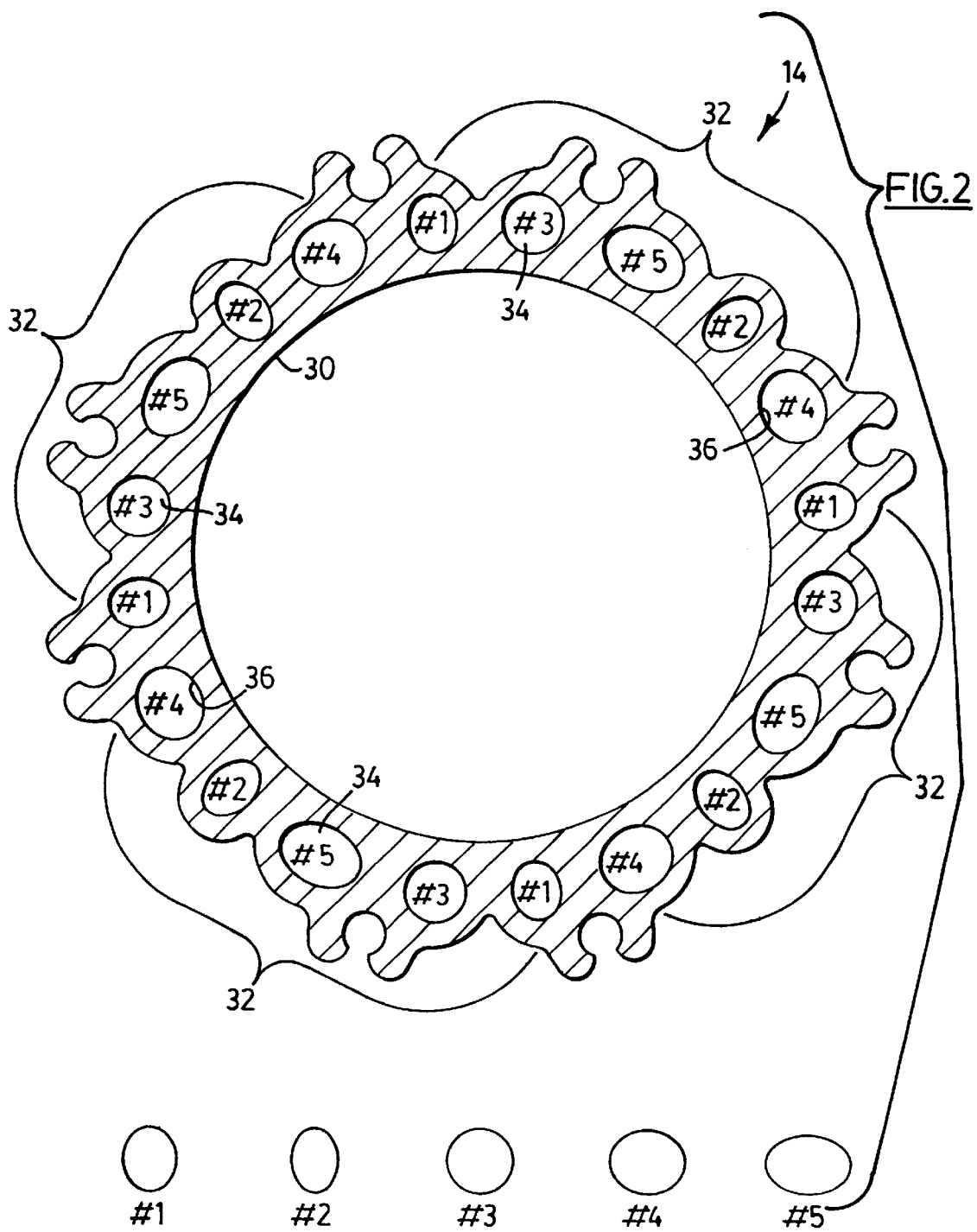
FIG. 2 is a cross-sectional view of the body of the ice-making machine heat exchanger taken along the line 2—2 in FIG. 1.
Figure 6:
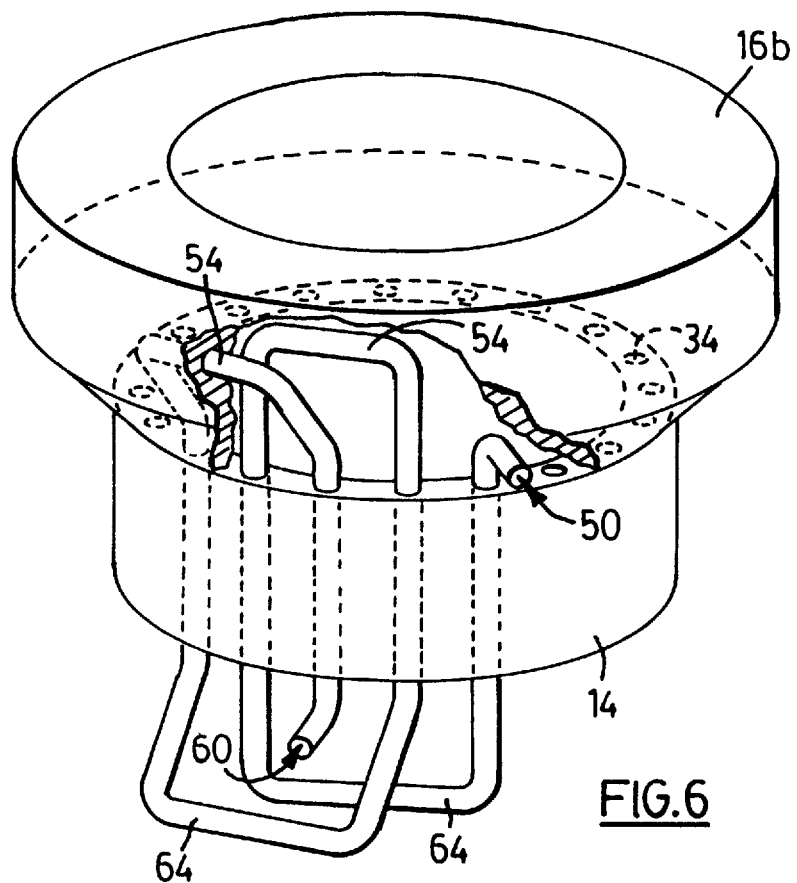
FIG. 6 is a perspective view of the portion of FIG. 3 showing the interconnections between refrigerant passages in a refrigerant circuit within the ice-making machine of FIG. 1.

FIGS. 1, 2 and 6 best illustrate the heat exchanger body 14. As can be seen, the heat exchanger body 14 is of a single piece construction formed from extruded aluminum and includes a cylindrical interior surface 30 which defines the heat exchange surface of the ice-making machine 10. The heat exchange surface 30 is coated with a corrosion and erosion resistant agent. The corrosion and erosion resistant agent is in turn coated with a release agent such as Teflon® to inhibit the deposition of ice crystals thereon.

A plurality of refrigerant circuits 32, in this example four, constituted by longitudinally extending refrigerant passages 34, are integrally formed in the heat exchanger body 14 and are circumferentially spaced about the heat exchanger body. Each refrigerant circuit 32 includes a plurality of refrigerant passages 34, in this case five which are labelled #1 to #5. The cross-sectional area of each of the refrigerant passages 34 in each refrigerant circuit 32 is different.

Specifically, the #1 and #2 refrigerant passages 34 are elliptical and have major axes aligned with radial lines extending from the center of the heat exchanger body 14. The #3 refrigerant passages 34 are circular. The #4 and #5 refrigerant passages 34 also are elliptical. However, the major axes of these refrigerant passages are tangential to the heat exchange surface 30. As can be seen, the #1 refrigerant passages have the smallest cross-sectional area. The cross-sectional area of the refrigerant passages 34 increases with the assigned notation so that the #5 refrigerant passages have the largest cross-sectional area. The elliptical cross-section of the #1, #2, #4 and #5 refrigerant passages 34 increases the surface area of the refrigerant passages as compared with circular passages and thereby increases heat transfer between brine solution contacting the heat exchange surface 30 and refrigerant flowing through the refrigerant passages 34. This of course increases the efficiency of the ice-making machine. As one of skill in the art will appreciate, other refrigerant passage cross-sections can be selected to increase the surface area of the refrigerant passages.

The interior of each refrigerant passage 34 is preferably designed to create turbulence as refrigerant flows through the refrigerant circuits 32 thereby to enhance boiling of the refrigerant. In this particular embodiment, this is achieved by providing a turbulence creating structure on the interior surfaces 36 of the refrigerant passages 34. Although not shown, it is preferred that the turbulence creating structure includes small trapezoidal fins on the interior surfaces 36, referred to as microfins.

The spacing between adjacent refrigerant passages 34 in each of the refrigerant circuits 32 and the good thermal conductivity of the aluminum heat exchanger body portion 14 allows heat transfer between the refrigerant circulating through the refrigerant passages 34 and brine solution contacting the heat exchange surface 30 to occur about generally the entire circumference of the refrigerant passages 34 and not just the portion of the refrigerant passage walls proximal to the heat exchange surface 30. This allows the efficiency of the ice-making machine 10 to be increased.

Referring now to FIGS. 1 and 6, the end plates 16 and 18 are better illustrated. The end plates 16 and 18 in this embodiment are annular and are formed in two pieces. If desired, the end plates may be casted as a single piece. Each end plate 16, 18 includes a central insert 16a, 18a formed of plastic material and an outer annular aluminum flange 16b, 18b surrounding and secured to the plastic insert 16a, 18a by suitable fasteners (not shown,). The end plates 16, 18 are bolted to opposed ends of the heat exchanger body 14.

The outer flange 16b of end plate 16 has four refrigerant inlets 50 integrally formed therein, two of which are shown in FIG. 1. Each refrigerant inlet 50 is connected to the #1 refrigerant passage 34 of a different refrigerant circuit 32 and receives a flow of refrigerant. Interconnect passages 54 are also formed in the outer flange 16b of end plate 16 and interconnect the #2 and #3 refrigerant passages 34 and the #4 and #5 refrigerant passages 34 of each refrigerant circuit 32.

The outer flange 18b of end plate 18 has four refrigerant outlets 60 formed therein, two of which are shown in FIG. 1. Each refrigerant outlet 60 is connected to the #5 refrigerant channel 34 of a different refrigerant circuit 32 and allows the refrigerant to exit the ice-making machine 10. Interconnect passages 64 are also formed in the outer flange 18b of end plate 18 to interconnect the #1 and #2 refrigerant passages 34 and the #3 and #4 refrigerant passages 34 of each refrigerant circuit 32. FIG. 6 illustrates the interconnections between the refrigerant passages 34 in one of the refrigerant circuits 32 as established by the interconnect passages 54 and 64 respectively.

The central insert 18a of end plate 18 includes a brine solution inlet 66 and an ice-brine slurry outlet 68 to permit the ingress of brine solution or ice-brine slurry into the ice-making machine 10 and to permit the egress of an ice-slurry brine from the ice-making machine 10. The brine solution inlet 66 co-operates with a hollow shaft 70 extending from the end plate 18 and partially into the central body portion 14. A bushing 72 on the end plate 18 allows the hollow shaft 70 to rotate about its longitudinal axis relative to the end plate 18.

A drive shaft 80 extends through the central insert 16a of end plate 16 and partially into the central body portion 14 before terminating at a pointed end 82 near the open end of the hollow shaft 70. Bushings 84 on the end plate 16 allow the drive shaft 80 to be rotated about its longitudinal axis by way of a motor (not shown) relative to the end plate 16. A seal 86 acts between the central insert 16a of end plate 16 and the shaft 80 to inhibit fluid leakage.

Figure 4:
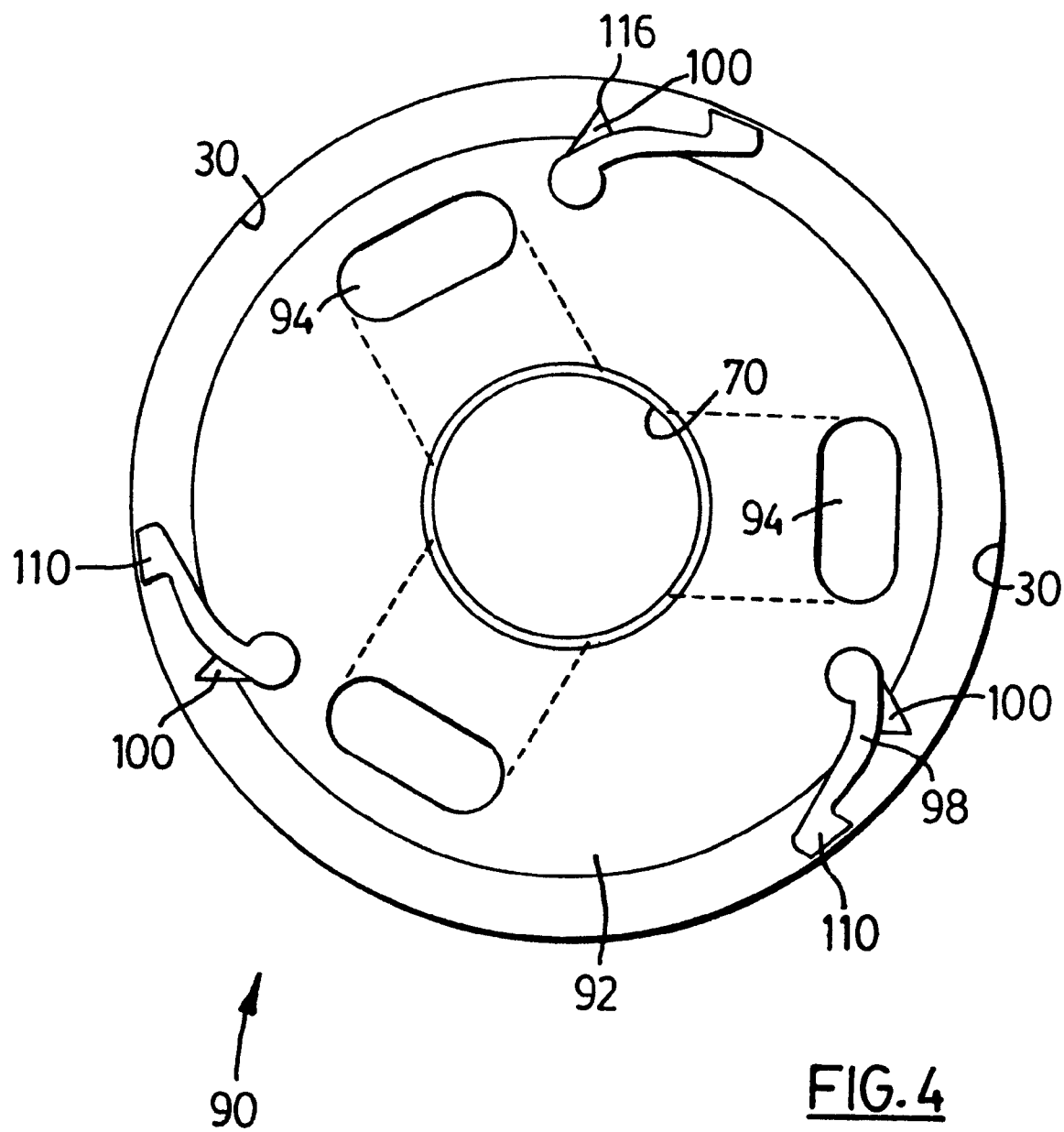
FIG. 4 is an end view of a blade assembly forming part of the ice-making machine of FIG. 1 taken in the direction of arrow 5.
Figure 5:
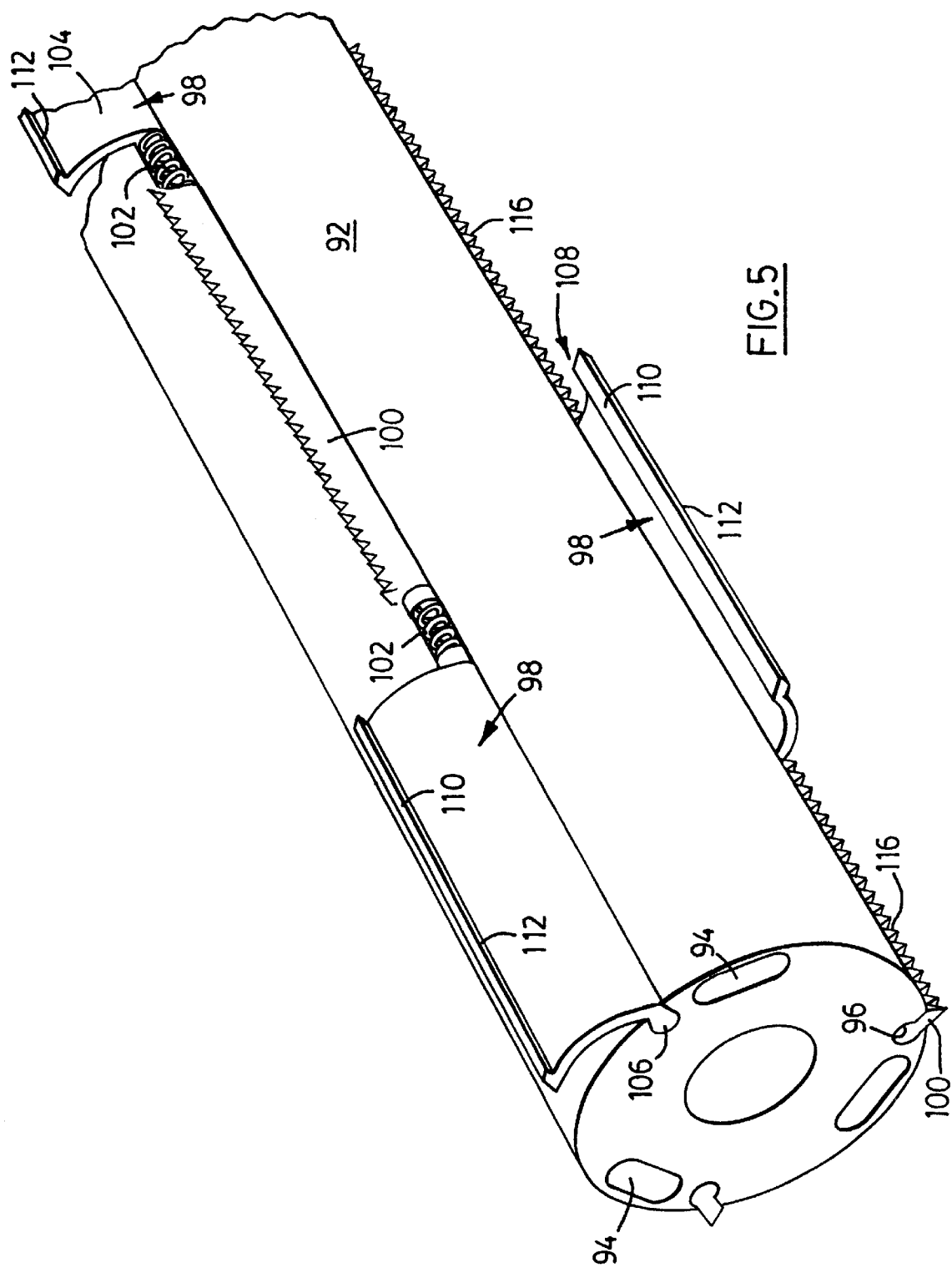
FIG. 5 is a perspective view of the blade assembly of FIG. 4.

A blade assembly 90 (best seen in FIGS. 1, 4 and 5) is mounted on the hollow shaft 70 and the drive shaft 80 and includes a cylindrical blade carrier 92 through which three spaced, passages 94 are provided. One end of each passage 94 is in fluid communication with the open end of the hollow shaft 70 while the opposite end of each passage 94 is positioned to discharge brine solution towards the heat exchange surface 30. The passages 94 are spaced 120° about the blade carrier 92 to balance the load placed on the shaft 82 as brine solution flows along the passages 94. The radial spacing 95 between the outer surface of the blade carrier 92 and the heat exchange surface 30 is small, in this example ¼ inch, to maintain high velocity brine solution flow through the ice-making machine 10 and inhibit the formation of ice crystals on the heat exchange surface 30.

The blade carrier 92 has a plurality of equi-circumferentially spaced, longitudinal keyed slots 96 formed in its outer surface. Each keyed slot 96 receives a plurality of blades 98 separated by spacers 100. The arrangement of blades 98 and spacers 100 along each slot 96 is such that the blades 98 accommodated by the various slots 96 are longitudinally offset but slightly overlap. Since the blades 98 are spaced about the blade carrier 92 by approximately 120° and are in contact with the heat exchange surface 30, the blades 98 help to center the shaft 82 with respect to the housing 12. Springs 102 act between the blades 98 at the ends of the slots 96 and the spacers 100 to push the blades 98 towards the respective end plates 16, 18.

Each blade 98 includes a flexible body 104 having one end 106 of a shape complimentary to the keyed slots 96. The free end 108 of the body 104 terminates in a hook 110 defining an edge 112 to contact and ride against the heat exchange surface 30. The blade 98 may be in the form of a composite with the hook 110 being formed of material more rigid than that of the flexible body 104. Alternatively, the blade 98 may be formed from a single rigid material and profiled to allow the body 104 to flex in the desired manner. The top surfaces of the spacers 100 are serrated to define scraper elements 116.

Figure 7:
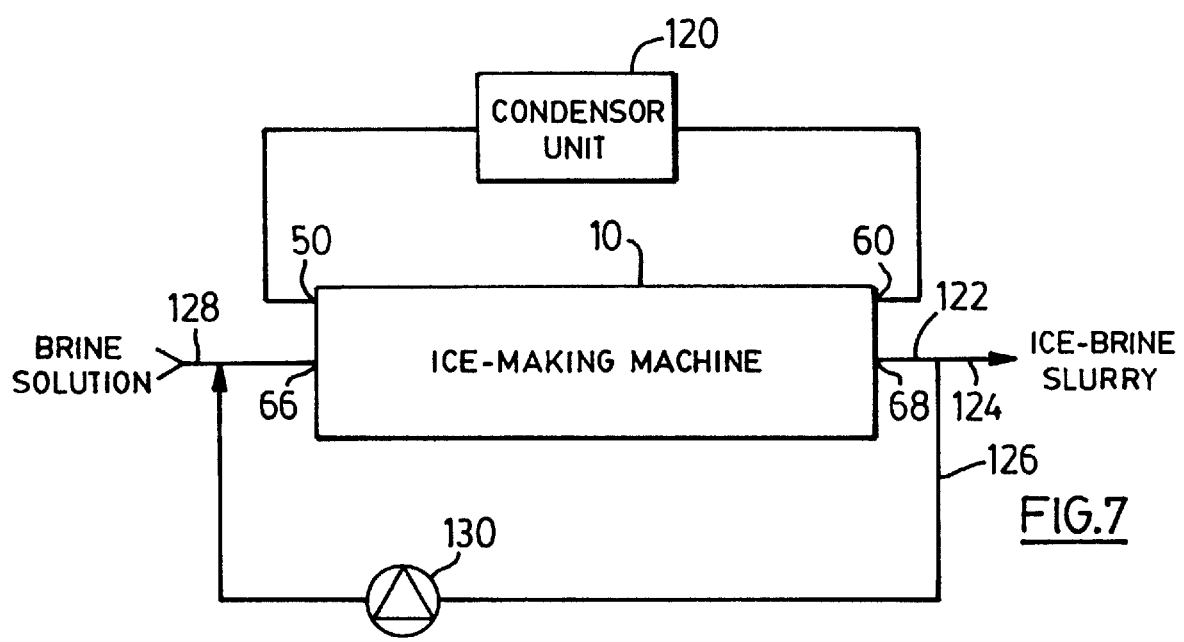
FIG. 7 is a schematic of the ice-making machine of FIG. 1 connected to an ice-brine slurry recirculation circuit.

Referring now to FIG. 7, the ice-making machine 10 is shown connected to an ice-making system. As can be seen, the refrigerant inlets 50 are connected to the outlet of a condenser unit 120 by way of an inlet header (not shown). The refrigerant outlets 60 are connected to the inlet of the condenser unit 120 by way of an outlet header (not shown). The condenser unit 120 condenses and compresses refrigerant exiting the ice-making machine 10 by way of the refrigerant outlets 60 before recirculating the refrigerant to the refrigerant inlets 50. The ice-brine slurry outlet 68 is connected to a discharge conduit 122. Discharge conduit 122 leads to an outlet 124 as well as to a recirculation conduit 126. Recirculation conduit 126 leads to an inlet conduit 128 which also receives brine solution. The inlet conduit 128 supplies brine solution and/or ice-brine slurry to the brine solution inlet 66. A pump 130 is positioned along the recirculation conduit 126 to recirculate ice-brine slurry. The amount of brine solution entering the inlet conduit 128 and mixing with the recirculated ice-brine slurry can be controlled to allow the ice fraction of ice-brine slurry produced by the ice-making machine 10 to be adjusted as desired.

The operation of the ice-making machine 10 will now be described. In operation brine solution or ice-brine slurry (hereinafter referred to as brine solution) is fed into the ice-making machine 10 through the brine solution inlet 66. The brine solution flows through the hollow shaft 70 and is then directed by the pointed end 82 of the drive shaft 80 towards the three passages 94 in the blade carrier 92. The brine solution flows along the three passages 94 until the brine solution exits the blade carrier 92 adjacent the heat exchange surface 30. While this is occurring, refrigerant enters each of the refrigerant circuits 32 by way of the refrigerant inlets 50. The refrigerant flows along the refrigerant passages 34 of each refrigerant circuit 32 and exits the refrigerant circuits 32 via the refrigerant outlets 60. As the refrigerant flows through the refrigerant passages 34 in the heat exchanger body 14, the refrigerant absorbs heat through the heat exchange surface 30 and boils. The brine solution in contact with the heat exchange surface 30 is thus super-cooled.

To avoid deposition of ice on the heat exchange surface 30 which would inhibit heat transfer to the refrigerant and thereby reduce the efficiency of the ice-making machine 10, the blade assembly 90 is rotated by the motor driven drive shaft 80. Specifically, the blade assembly 90 is rotated at a rate of speed that is fast enough to allow the blades 98 to remove the supercooled brine solution from the heat exchange surface 30 prior to crystallization of ice crystals on the heat exchange surface 30. The supercooled brine solution therefore crystallizes in the brine solution between the blade carrier 92 and the heat exchange surface 30 allowing the brine solution to act as a secondary refrigerant in the formation of fine ice crystals throughout the brine solution.

The flexible nature of the blade bodies 104 allows the blades to conform to the heat exchange surface 30 as the blades 98 are rotated. If a layer of ice should inadvertently form on the heat exchange surface 30, the blades 98 will flex until they overlie the outer surface of the blade carrier 92. When this occurs, the scraper elements 116 project radially beyond the blades 98 allowing the scraper elements 116 to scrape the ice layer and avoid damage to the blades 98.

The small radial spacing 95 between the blade carrier 92 and the heat exchange surface 30 ensures high velocity brine solution flow from the passages 94 to the ice-brine slurry outlet 68 in the end plate 18. This further assists to inhibit the formation of ice crystals on the heat exchange surface 30.

In order to increase efficiency of the ice-making machine 10, the refrigerant passages 34 in each refrigerant circuit 32 increase in cross-sectional area along the length of the refrigerant circuit. The increased cross-sectional area maintains a high velocity of refrigerant as the refrigerant circulates through the refrigerant circuits 32 while avoiding a high pressure drop along the length of the refrigerant circuits 32 helping to increase the efficiency of the ice-making machine. In addition, the staggered arrangement of the various refrigerant passages 34 in each refrigerant circuit 32 helps to equalize heat transfer over the circumference of the heat exchanger body 14 and thereby maintain a uniform temperature within the ice-making machine 10. Moreover, the microfin structure on the interior surfaces 36 of the refrigerant passages 34 enhances boiling of the refrigerant thereby improving its heat transfer ability.

As those of skill in the art will appreciate, the present ice-making machine allows fine ice particles in a brine solution to be made efficiently by increasing and equalizing heat transfer between the brine solution and the refrigerant over basically the entire heat exchange surface.

Although the end plate 18 has been described as having the brine solution inlet and the ice-brine slurry outlet provided therein, the brine solution inlet and ice-brine slurry outlet can be provided in end plate 16 or the brine solution inlet can be provided in one end plate and the ice-brine slurry outlet can be provided in the other end plate. Also, although end plate 16 is shown to include the refrigerant inlets and end plate 18 is shown to include the refrigerant outlets, the position of the refrigerant inlets and outlets can be reversed. Also, both the refrigerant inlets and refrigerant outlets can be formed in either the end plate 16 or end plate 18 if desired.

Referring now to FIGS. 8 and 9 another embodiment of an ice-making machine in accordance with the present invention is shown. In this embodiment, like reference numerals will be used to indicate like components with a suffix "1" added for clarity. As can be seen, a plurality of ice-making machines 10' are stacked in an array. In this embodiment, the outer flanges 16b', 18b' of the end plates 16', 18' are hexagonal allowing the ice-making machines 10' to be nested. The refrigerant inlets 50' in the end plates 16' are arranged in pairs. Each pair of refrigerant inlets 50' is connected to a refrigerant conduit 200 extending between opposed sides of the end plates 16'. The open ends of the refrigerant conduits 200 are aligned with the refrigerant conduits 200 in the end plates 16' of adjacent ice-making machines 10'. O-ring seals 202 act between adjacent ice-making machines 10' to inhibit refrigerant leakage. A base 204 is attached to the end plate 16' of the bottom ice-making machine 10' of each stack to seal one end of the refrigerant conduits 200. An inlet header 206 is attached to the end plate 16' of the top ice-making machine 10' of each stack to receive a flow of refrigerant and allow the refrigerant to be delivered to each of the ice-making machines 10' in the stack.

The end plates 18 are of a similar design to allow refrigerant exiting the refrigerant circuits in each of the ice-making machines 10' to be fed to refrigerant conduits. The refrigerant conduits in the end plates 18 of the ice-making machines 10' in each stack are interconnected and lead to an outlet header attached to the top ice-making machine 10' in each stack.

Although not shown, the end plates 16' and 18' can also be designed to include a similar arrangement for the brine solution inlet and ice-brine slurry outlet. This modular design of the ice-making machines allows the ice-making machines to be arranged in an array of a size selected to produce ice-brine slurry at the desired capacity.

Although the refrigerant passages have been described as being coated with a corrosion and erosion resistant agent and receiving the flow of refrigerant directly, the refrigerant passages and interconnect passages can be lined with tubing if desired to accommodate the flow of refrigerant along the refrigerant circuits.

Figure 10A:
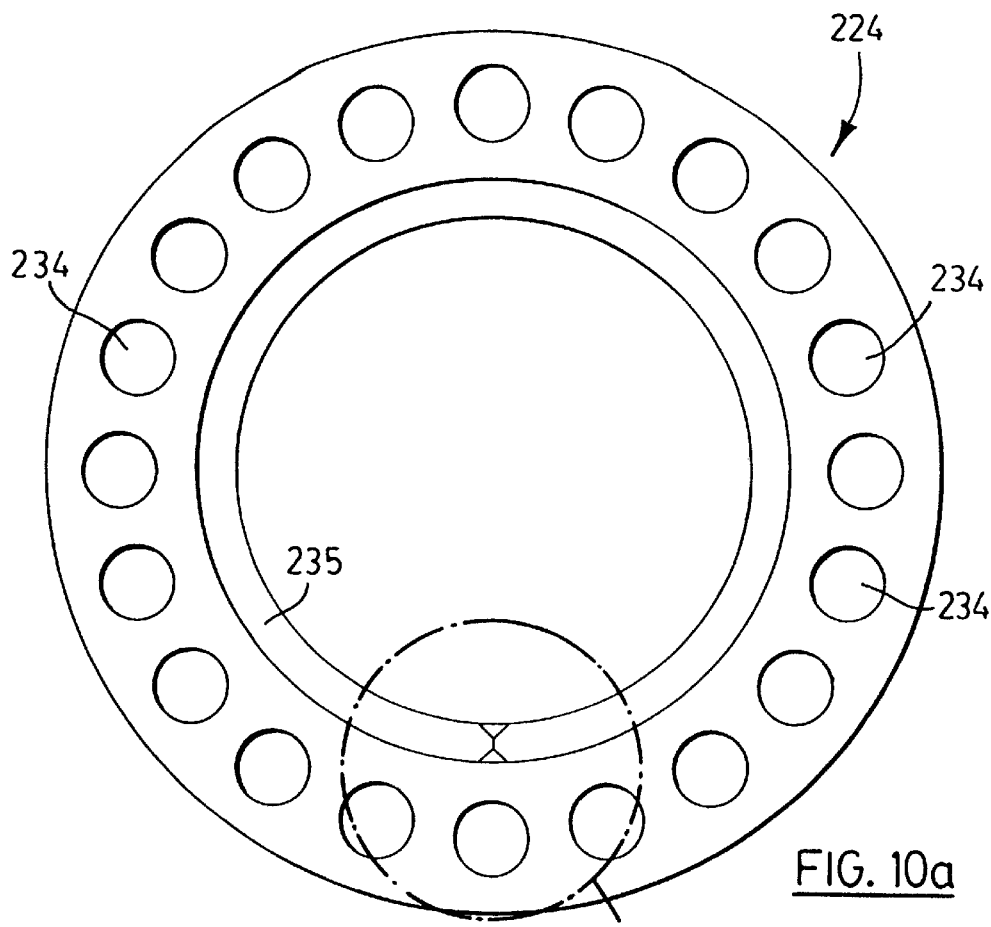
FIG. 10a is an end view of a heat exchanger body for an ice-making machine in accordance with the present invention.
Figure 10B:
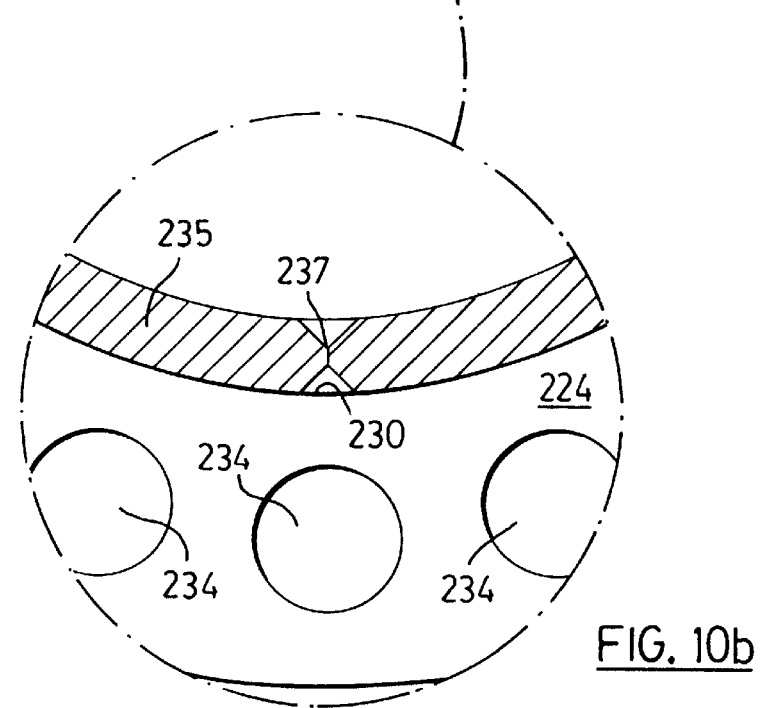
FIG. 10b is an enlarged portion of Figure 10b.

Referring now to FIGS. 10a and 10b, an alternative embodiment of a heat exchanger body is shown and is generally indicated to by reference numeral 224. Similar to the first embodiment, the heat exchanger body is of a single piece construction formed from extruded aluminum and includes a cylindrical interior surface 230. A plurality of cylindrical, refrigerant passages 234 extend through the body at generally equal, circumferentially spaced locations. The cross-sectional area of each refrigerant passage 234 is the same.

A thin cylindrical sleeve 235 formed of stainless steel lines the interior surface 230 to protect the heat exchanger body 224 from corrosion and erosion. The sleeve 235 is heat shrunk to the heat exchanger body and defines the heat exchange surface contacted by the rotating blades. The abutting ends 237 of the sleeve 235 are welded to inhibit brine solution from contacting the heat exchanger body.

Figure 11A:
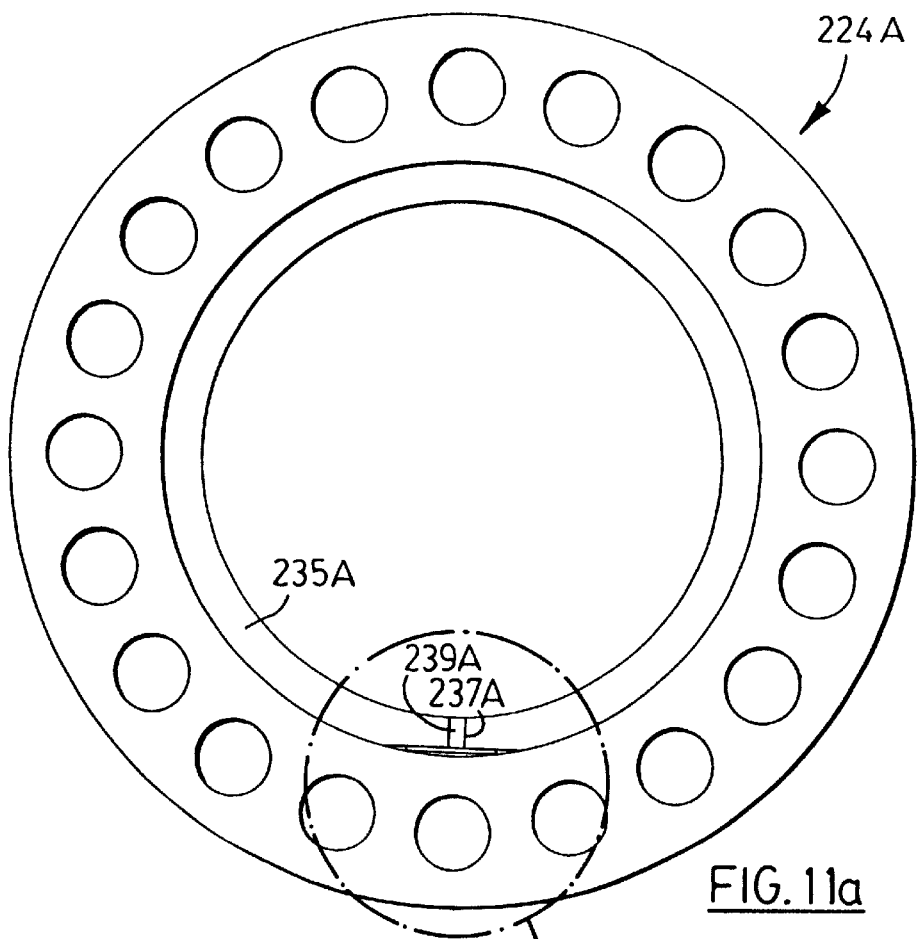
FIG. 11a is an end view of another embodiment of a heat exchanger body for an ice-making machine in accordance with the present invention.
Figure 11B:
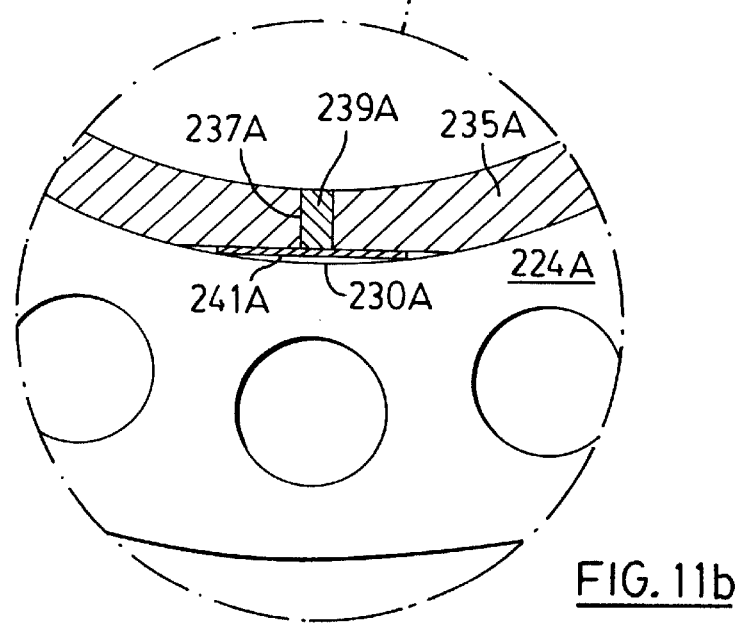

FIGS. 11a and 11b show yet another embodiment of a heat exchanger body 224A similar to that of FIGS. 10a and 10b. In this embodiment, the cylindrical sleeve 235A is glued to the interior surface 230A of the heat exchanger body. The ends 237A of the cylindrical sleeve 235 are joined by an adhesive 239A. A thin strip of tape 241A disposed between the sleeve 235A and the heat exchanger body 230A is secured to the sleeve 235A and runs the length of the adhesive 239A to form a seal thereby to inhibit brine solution from leaking through the adhesive and contacting the heat exchanger body 224A.

Figure 12A:
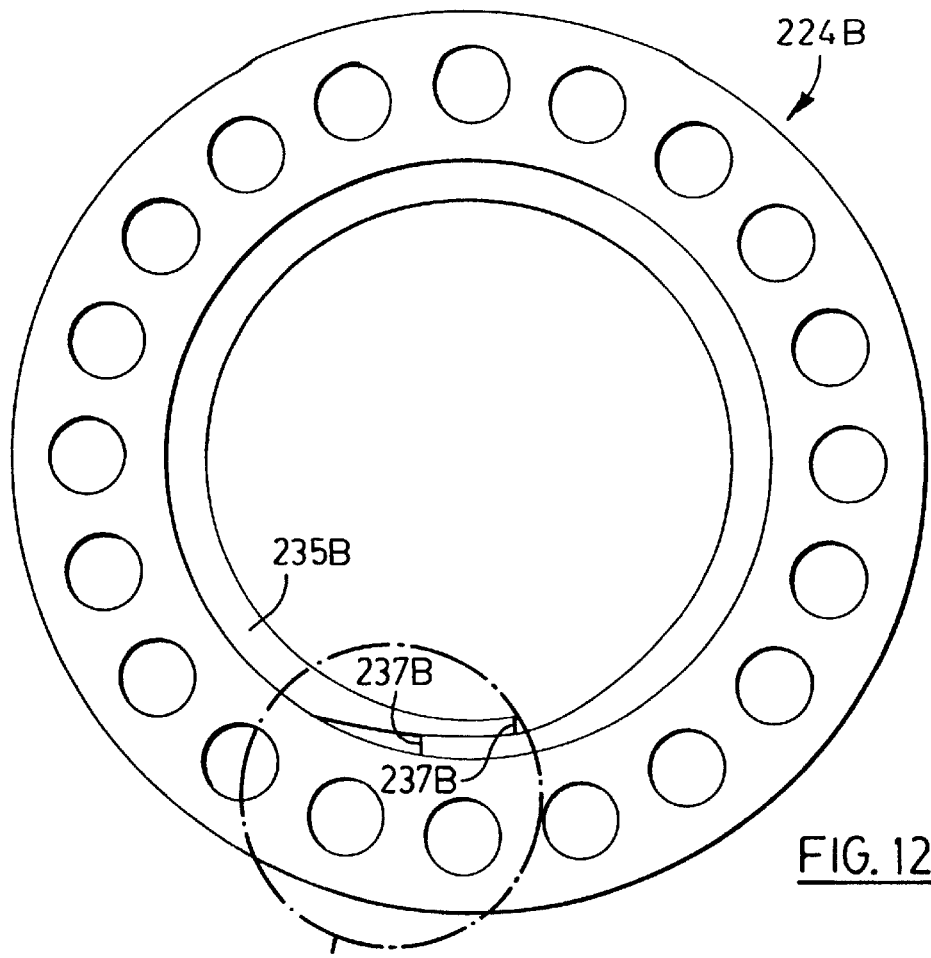
FIG. 12a is an end view of yet another embodiment of a heat exchanger body for an ice-making machine in accordance with the present invention.
Figure 12B:
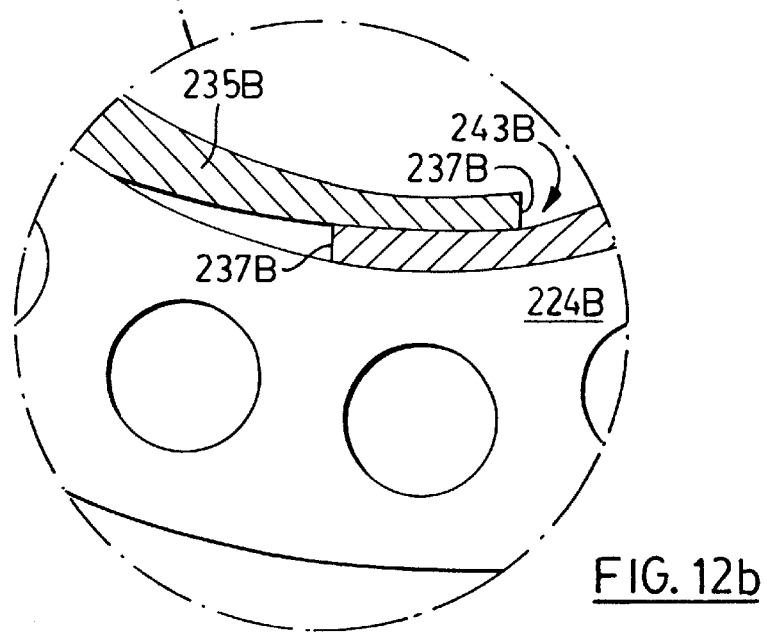

FIGS. 12a and 12b show yet another embodiment of a heat exchanger body 224B similar to that of FIGS. 10a and 10b. In this embodiment, the cylindrical sleeve 235B is also glued to the interior surface 230B of the heat exchanger body. The ends 237B of the cylindrical sleeve overlap and are glued to one another. The overlap is small, in this case $2/1000"$, to minimize effects on the rotating blades. The overlapping ends 237B are also arranged so that the blades rotate in a direction away from the step 243B defined by the interior end of the sleeve 235B.

Figure 13A:
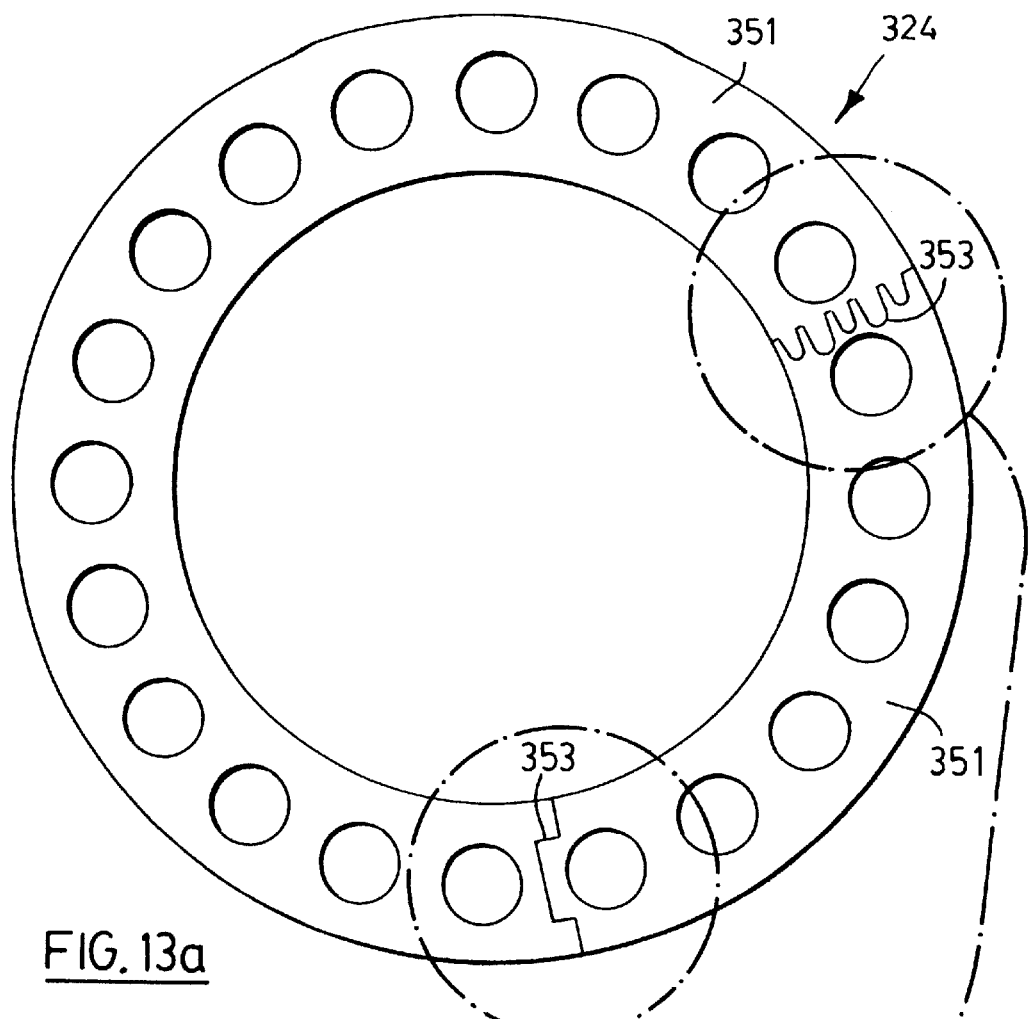
FIG. 13a is an end view of yet another embodiment of a heat exchanger body for an ice-making machine in accordance with the present invention.
Figure 13C:
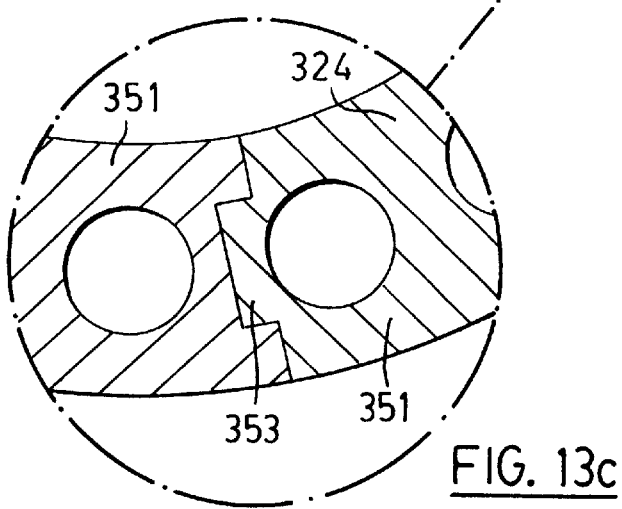
Figure 13B:
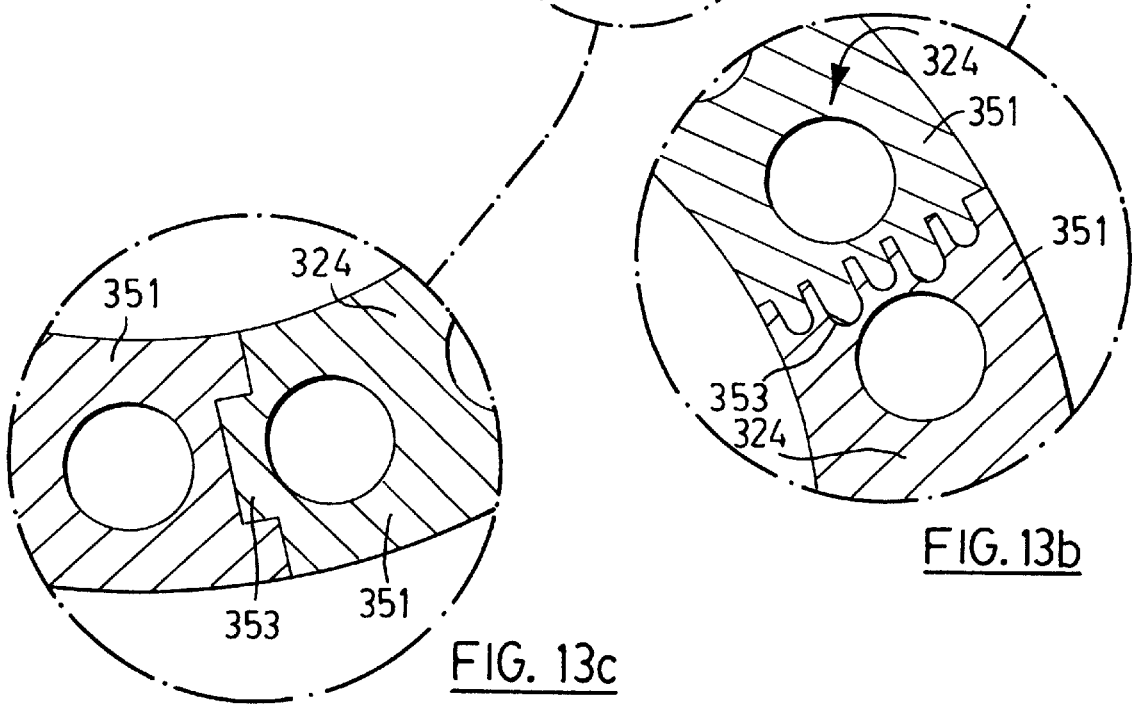

Referring now to FIGS. 13a to 13c yet another embodiment of a heat exchanger body 324 is shown. In this embodiment, the cylindrical heat exchanger body is constituted by a plurality of interlocking elongate, arcuate extruded aluminum segments 351. Refrigerant passages 334 extend longitudinally through the arcuate segments 351 at spaced locations. The abutting ends of the arcuate segments include co-operating formations 353. As shown, the cooperating formations joining the arcuate segments differ although similar formations can be used at each joint between arcuate segments 351. In this embodiment, similar to the first embodiment, the interior surface 330 of the heat exchanger body 324 is coated with a corrosion and erosion resistant agent.

Figure 14A:
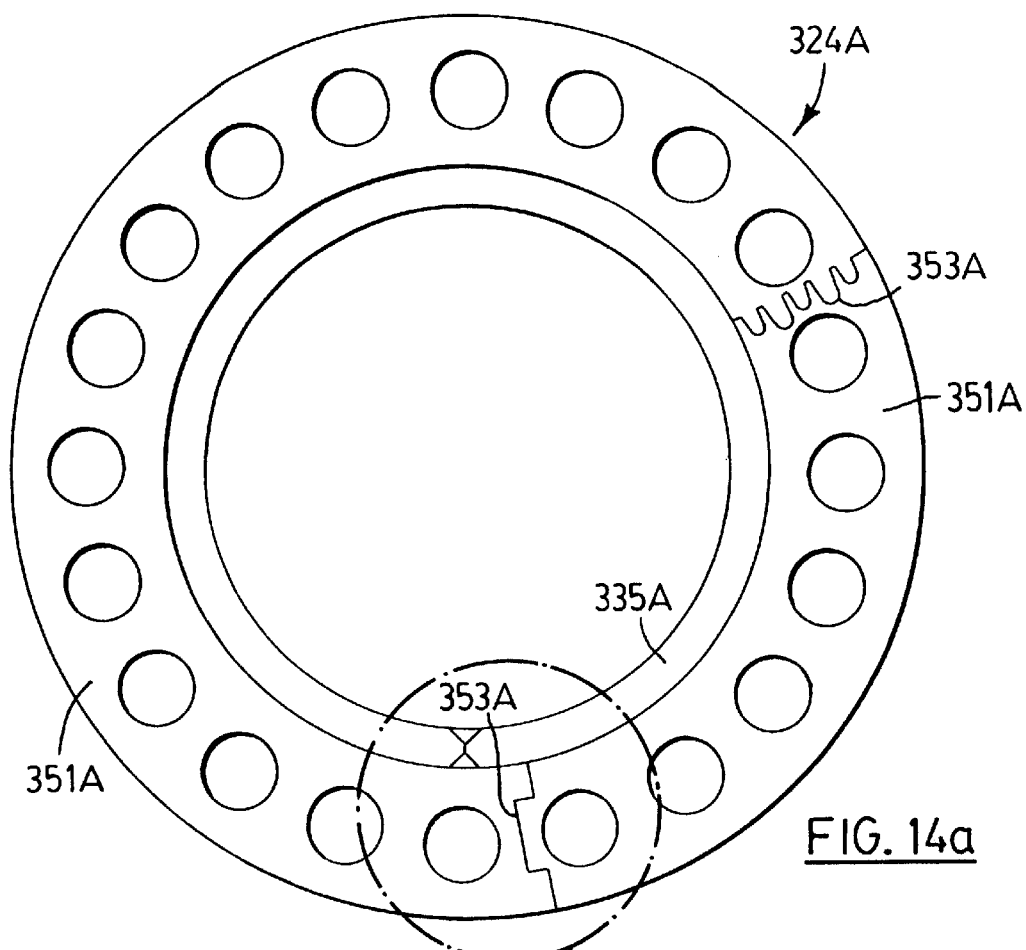
FIG. 14a is an end view of still yet another embodiment of a heat exchanger body for an ice-making machine in accordance with the present invention.
Figure 14B:
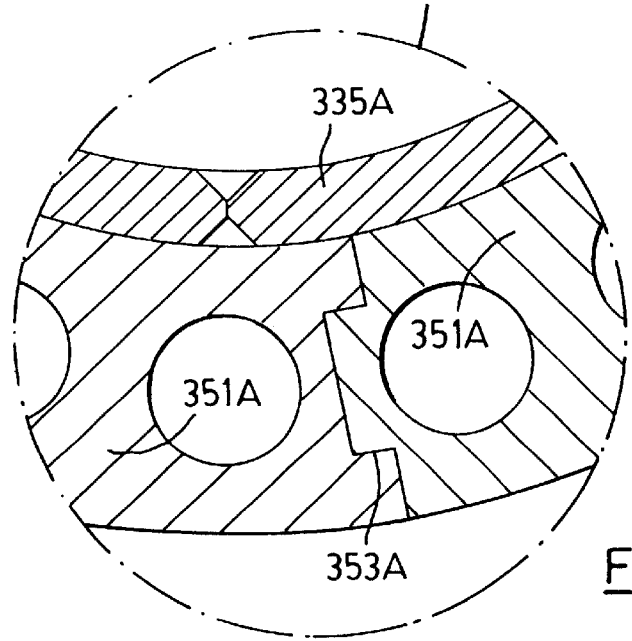

FIGS. 14a and 14b show a heat exchanger body 324A identical to that of FIGS. 13a to 13c. In this case, however, the heat exchanger body 324A is lined with a cylindrical sleeve 335A identical to that shown in FIGS. 10a and 10b to protect the heat exchanger body from corrosion and erosion.

Figure 15A:
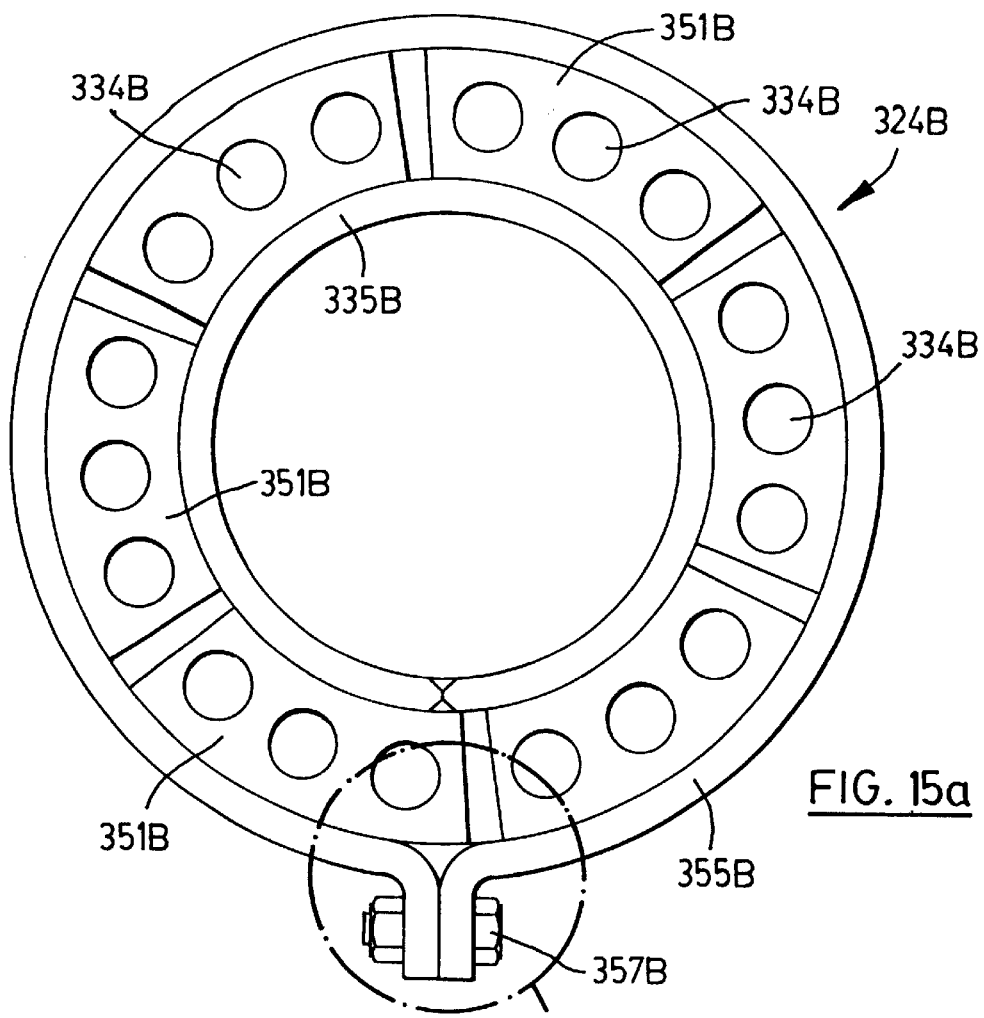
FIG. 15a is an end view of still yet another embodiment of a heat exchanger body for an ice-making machine in accordance with the present invention.
Figure 15B:
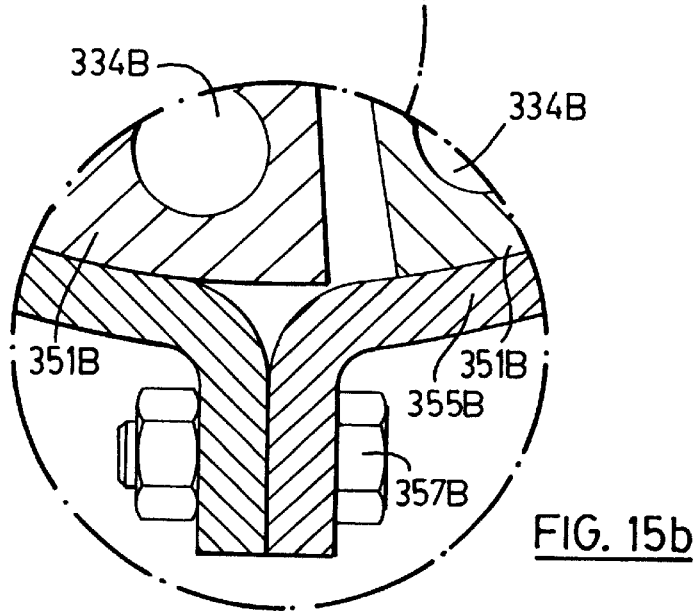

FIGS. 15a and 15b show yet another embodiment of a heat exchanger body 324B. In this embodiment, the heat exchanger body is constituted by a plurality of circumferentially spaced, elongate, arcuate extruded aluminum segments 351B. Refrigerant passages 334B extend longitudinally through each arcuate segment. An inner cylindrical sleeve 335B identical to that of FIGS. 10a and 10b lines the interior of the arcuate segments 351B to define the cylindrical heat exchange surface contacted by the rotating blades. A cylindrical clamp 355B surrounds the arcuate segments 351B to inhibit their movement. Fasteners in the form of nuts and bolts 357B (only one of which is shown) secure the ends of the clamp 355B at spaced locations along its length.

Figure 16A:
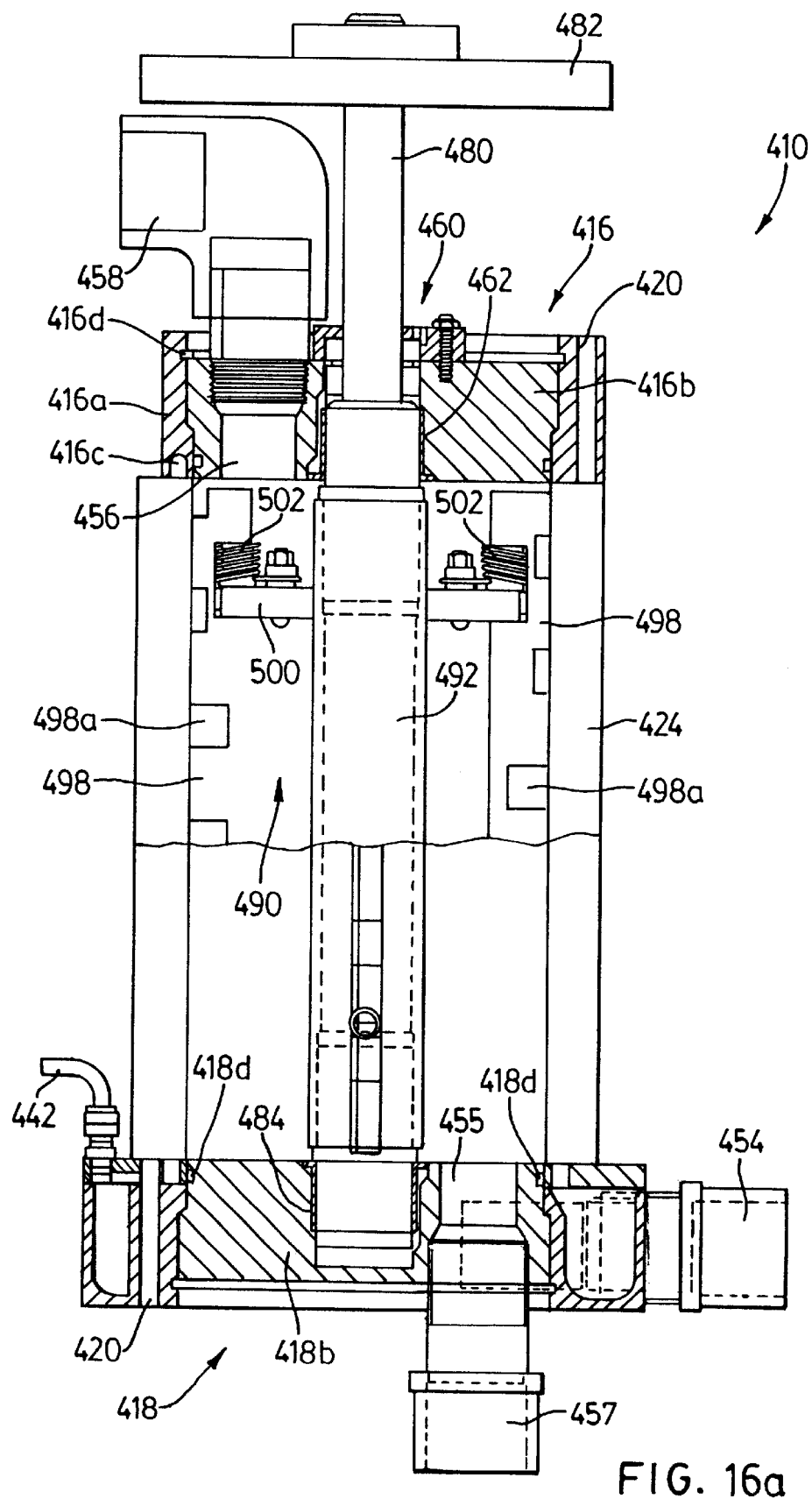
FIG. 16a is a front elevational view, partly in section, of another embodiment of an ice-making machine in accordance with the present invention.
Figure 16B:
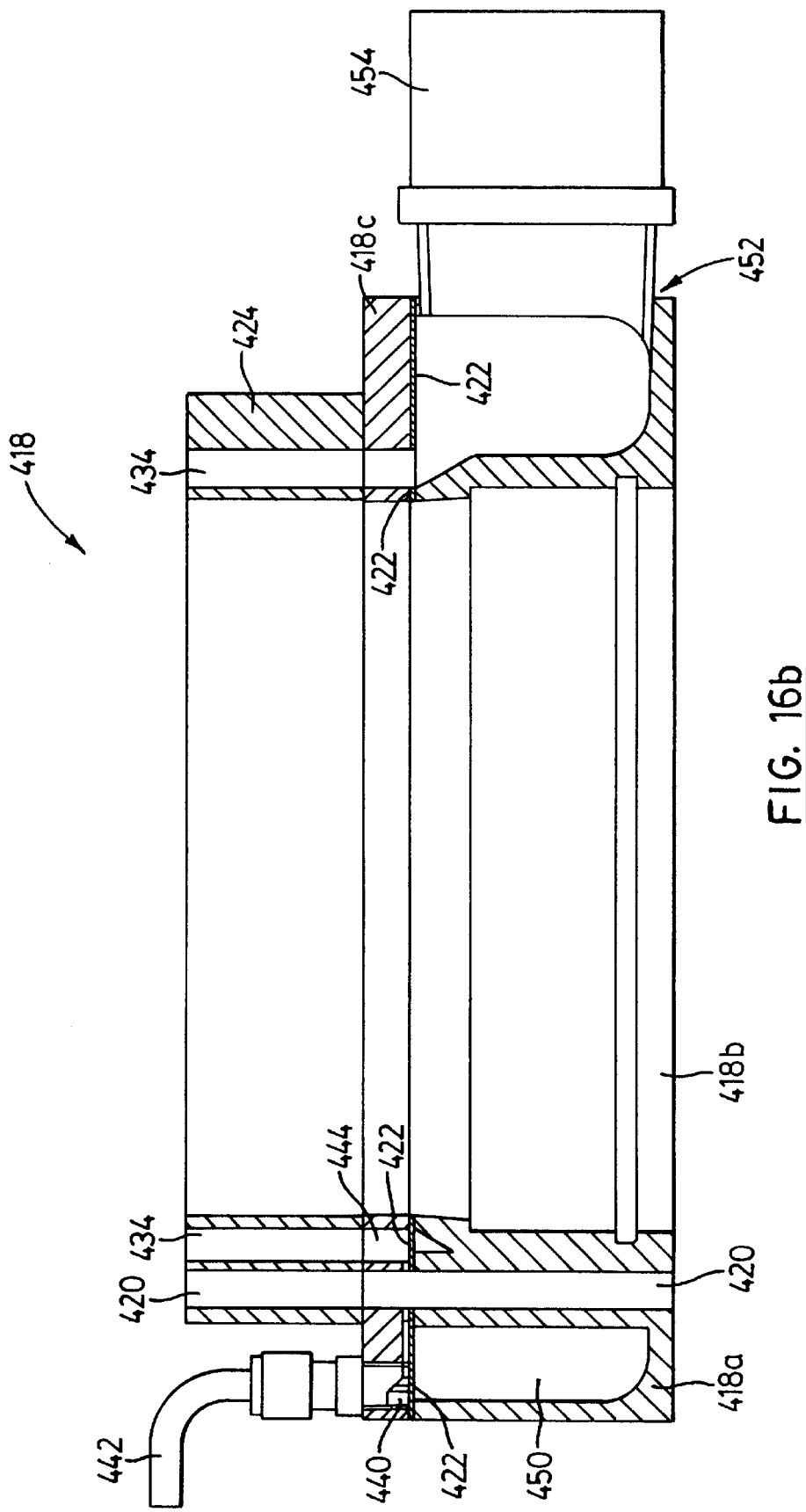
Figure 16C:
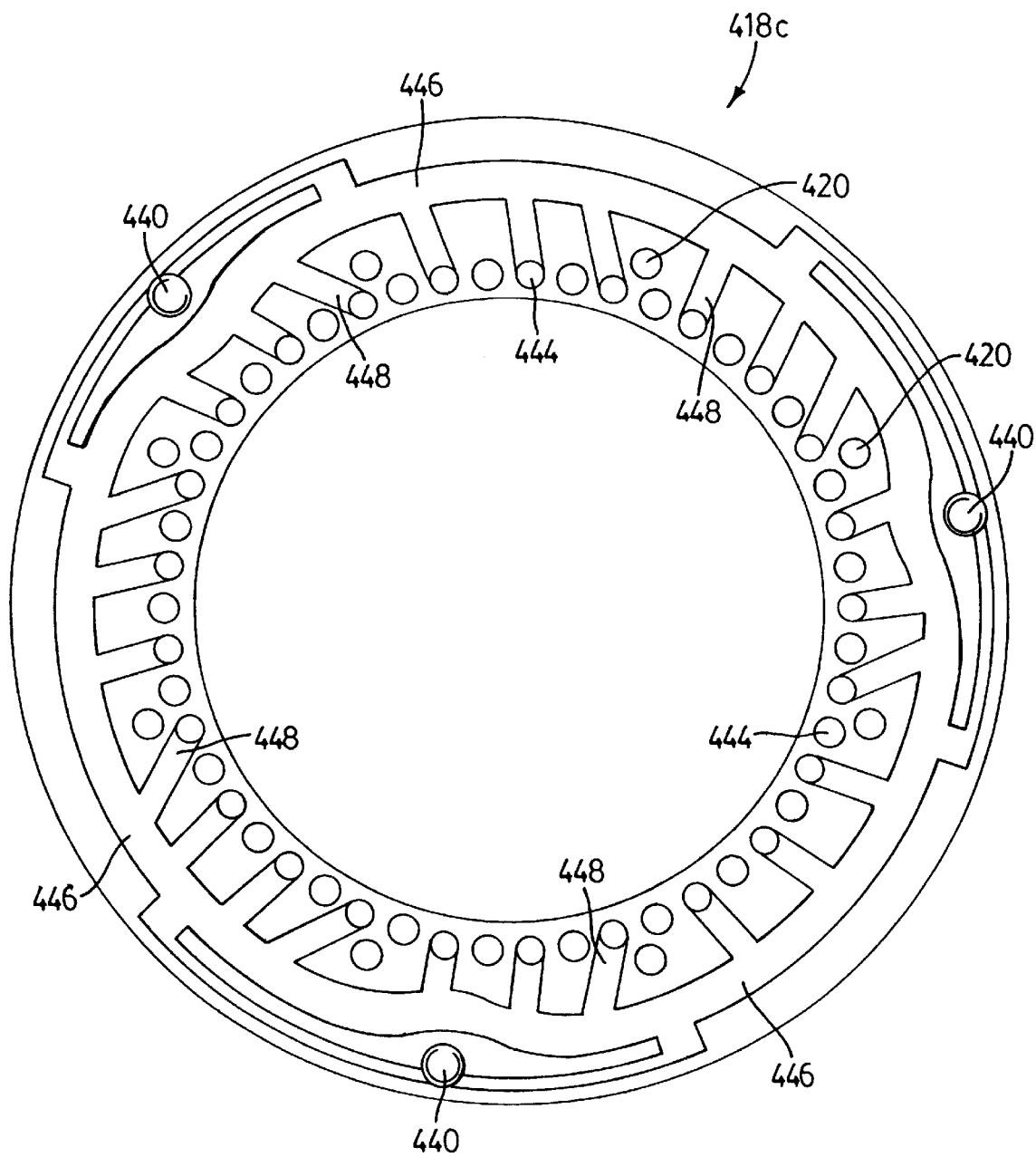
FIG. 16c is a bottom plan view of an aluminum flange forming part of the bottom end plate of FIG. 16b.

Referring now to FIGS. 16a to 16c, another embodiment of an ice-making machine in accordance with the present invention is shown and is indicated to generally by reference numeral 410. The ice-making machine includes a housing 412 constituted by a cylindrical heat exchanger body 424 similar to that shown in FIGS. 10a and 10b, and upper and lower end plates 416 and 418 secured to opposed ends of the heat exchanger body by suitable fasteners (not shown). The fasteners pass through aligned holes 420 in the end plates 416 and 418 and heat exchanger body 424. Gaskets (not shown) are positioned between the heat exchanger body 424 and the end plates 416 and 418 to inhibit leakage.

FIG. 16b better illustrates the lower end plate 418. As can be seen, the lower end plate includes a lower outer, annular aluminum flange 418a, an inner plastic insert 418b and an upper outer, annular aluminum flange 418c. An annular plate 422 is disposed between the upper and lower outer flanges 418c and 418a respectively. The upper outer annular flange 418c includes three outer refrigerant inlets 440 to which refrigerant conduits 442 receiving a flow of refrigerant are connected. Refrigerant passages 444 extend through the annular flange 418c and are aligned with the refrigerant passages 434 in the heat exchanger body 424. The refrigerant inlets 440 communicate with an annular refrigerant track 446 (see FIG. 16c) formed in the undersurface of the flange 418c. Fingers 448 extend inwardly from the refrigerant track 446 and terminate at every second refrigerant passage 444.

The lower outer annular flange 418a has an annular refrigerant channel 450 formed therein. An opening 452 is formed in the side of the flange 418a and accommodates a refrigerant outlet 454 which communicates with the refrigerant channel 450.

The plate 422 separating the upper and lower annular flanges 418a and 418c respectively, has a plurality of holes formed in it. The holes are aligned with the refrigerant passages 444 in the upper outer annular flange 418c that do not communicate with the fingers 448. Thus, these refrigerant passages 444 communicate with the refrigerant channel 450 in the lower flange 418a.

The plastic insert 418b is clamped to the upper and lower flanges 418a and 418c by C-clamps 418d. An opening 455 is provided in the insert 418b and accommodates a brine solution inlet 457. The plastic insert 418b also accommodates a bushing 484.

The upper end plate 416 is also of a multipiece construction and includes an outer aluminum flange 416a and an inner plastic insert 416b clamped to the flange by C-clamps 416d. The flange 416a has a plurality of interconnect passages 416c formed therein. Each interconnect passage 416c communicate with a pair of adjacent refrigerant passages 434 formed in the heat exchange body 424. The plastic insert 416b has an opening 456 therein accommodating an ice-brine slurry outlet 458. A central opening 460 is also provided in the plastic insert 416b and accommodates a bushing 462.

A drive shaft 480 extends centrally through the housing 412. One end of the drive shaft is accommodated by the bushing 484 in the plastic insert 418b. The other end of the drive shaft extends through the plastic insert 416b and bushing 462 and is coupled to a motor 482.

A blade assembly 490 is mounted on the drive shaft 480 within the heat exchanger body 424. The blade assembly 490 includes a cylindrical blade carrier 492 surrounding the drive shaft. Three elongate blades 498 are mounted on the carrier 492 at spaced locations and contact the heat exchange surface. The blades 498 arc pivotally mounted on spaced posts 500 extending radially from the blade carrier 492. Springs 502 act between the blades 498 and the posts 500 to bias the blades 498 so that they form angles with respect to the tangent of the heat exchange surface equal to approximately 110 degrees. The blades 498 are notched; however, the notches 498a in the blades are staggered so that the entire heat exchange surface is contacted by at least one blade.

In operation, brine solution is fed into the ice-making machine 410 through the brine solution inlet 454. At the same time, the motor 482 rotates the drive shaft 480 and hence the blade assembly 490 so that the blades 498 sweep across the heat exchange surface. While the above occurs, refrigerant is fed into the refrigerant conduits 442 and delivered to the refrigerant inlets 440. As refrigerant enters the refrigerant inlets 440, the refrigerant is directed into the annular refrigerant track 446 by the plate 422 which isolates the refrigerant track 446 and refrigerant inlets 440 from the refrigerant channel 450. Refrigerant directed into the refrigerant track 446 flows into the fingers 448 and then into every second refrigerant passage in the heat exchanger body 424 through every second refrigerant passage 444. The refrigerant delivered to every second refrigerant passage in the heat exchanger body flows the length of the heat exchanger body to the upper end plate 416. When the refrigerant in the refrigerant passages reaches the upper end plate 416, the interconnect passages 416c direct the refrigerant into the adjacent refrigerant passages in the heat exchanger body 424. The refrigerant in turn flows the length of the refrigerant passages back down to the lower end pate 418. When the refrigerant reaches the lower end plate 418, the refrigerant flows into the refrigerant passages 444, through the holes in the plate 442 and enters the refrigerant channel 450. The refrigerant is collected in the channel 450 and is discharged via the refrigerant outlet 454. As the refrigerant flows through the refrigerant passages in the heat exchanger body 424, the refrigerant absorbs heat from the brine solution through the heat exchanger body and boils. The brine solution in contact with the heat exchanger surface is thus, supercooled.

To avoid disposition of ice on the heat exchange surface, the motor 482 rotates the drive shaft 480 so that the blades 498 sweep across the heat exchange surface fast enough to remove the super-cooled brine solution from the heat exchange surface prior to crystallization of ice crystals on the heat exchange surface. The super-cooled brine solution therefore crystallizes in the brine solution between the blade carrier 492 and the heat exchange surface allowing the brine solution to act as a secondary refrigerant in the formation of fine ice crystals throughout the brine solution. The ice-brine slurry created in the heat exchanger body 424 exits the ice-making machine through the ice-brine slurry 458 outlet as additional brine solution is fed into the ice-making machine 410.

As will be appreciated, in this embodiment refrigerant passes only along two refrigerant passages in the heat exchanger body 424 before being discharged ensuring efficient heat transfer. Also, because the end plates 416 and 418 include outer aluminum flanges and inner plastic inserts, manufacturing costs are significantly reduces. In addition, since refrigerant is delivered to the refrigerant track 446 at three equally spaced locations, the distribution of refrigerant to the refrigerant passages in the heat exchanger body 424 is generally even thereby maintaining generally uniform heat exchange within the ice-making machine 410.

Figure 17:
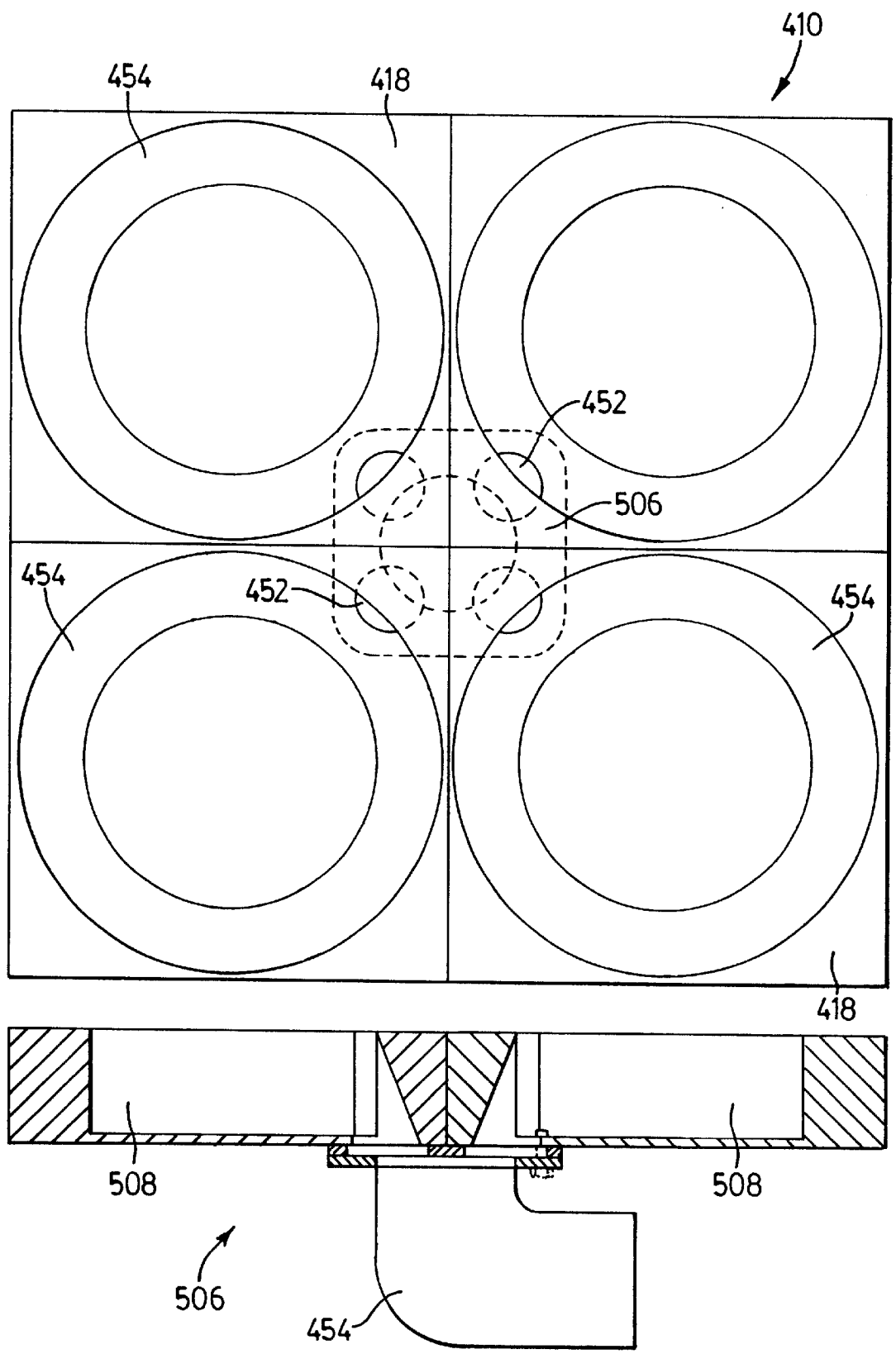
FIG. 17 shows top plan and cross-sectional views of a plurality of ice-making machines arranged in an array and having refrigerant passages joined by a common collector.

FIG. 17 shows a plurality of ice-making machines 410 of the type shown in FIGS. 16a to 16c arranged in symmetrical 2×2 array. As can be seen, in this arrangement, the lower end plates 418 are generally rectangular in top plan. The lower outer flange 418*a* of each end plate however still includes a circular refrigerant channel 454. An opening 452 is formed through the lower flange 418*a* of each end plate and partially intersects the refrigerant channel 454. A collector 506 secured to the bottom of the array includes four channels 508 each communicating with one of the openings 452. The channels 508 lead to a single refrigerant outlet 454. This allows refrigerant fed to three refrigerant inlets 440 of each ice-making machine 410 to be collected and discharged at a common point.

Figure 18A:
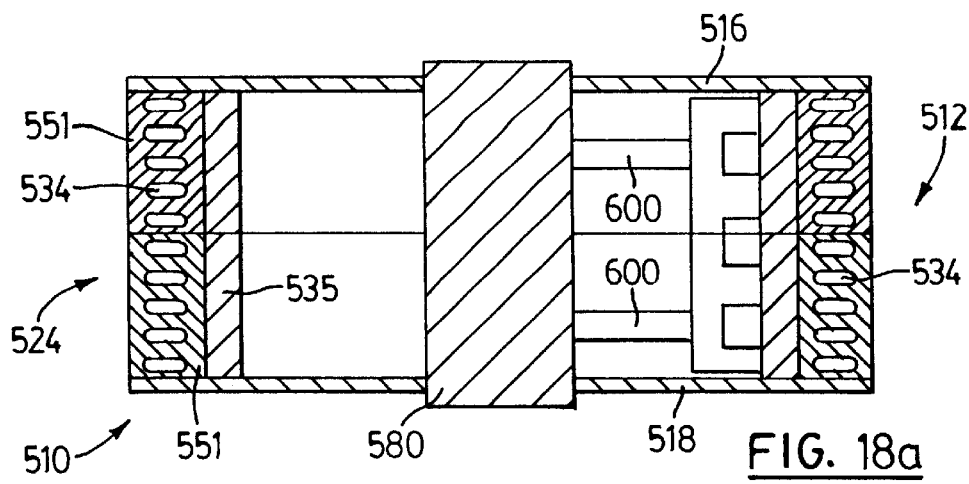
FIGS. 18a, 18b and 18c are cross-sectional, top plan and side elevational views of another embodiment of an ice-making machine in accordance with the present invention.
Figure 18B:
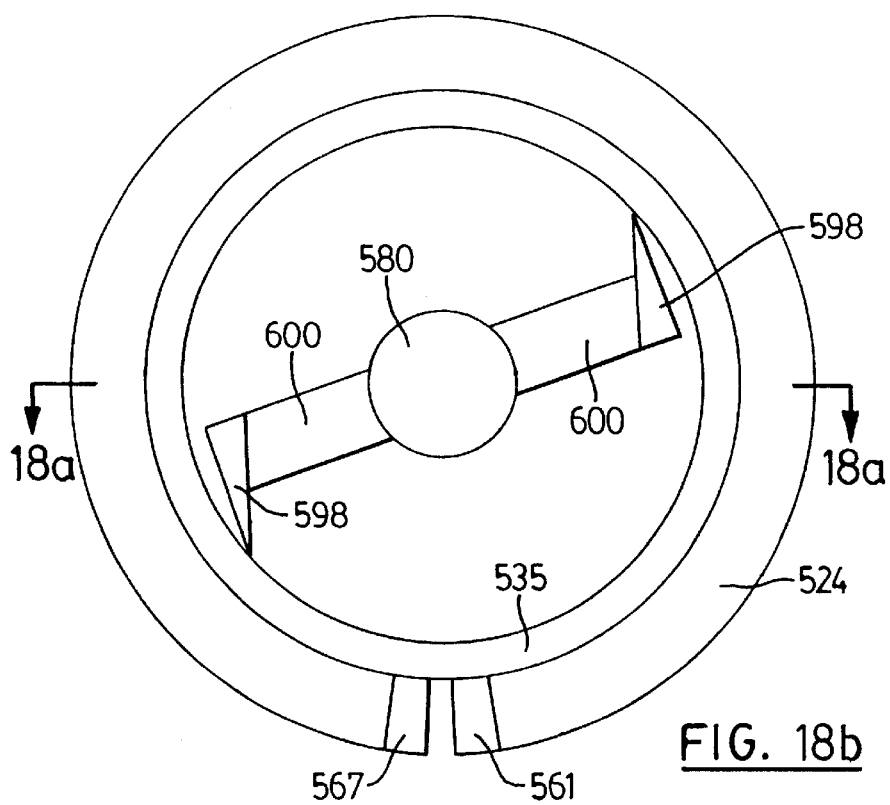
Figure 18C:
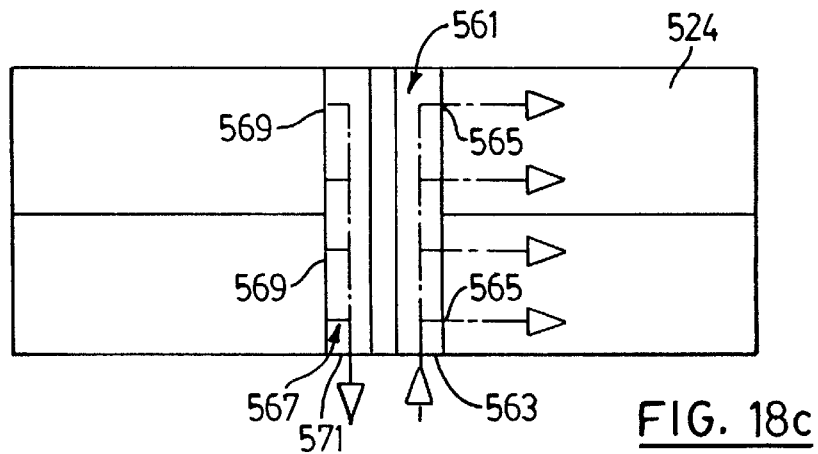

Referring now to FIGS. 18*a* to 18*c*, yet another embodiment of an ice-making machine in accordance with the present invention is shown and is generally indicated to by reference numeral 510. As can be seen, the ice-making machine includes a generally cylindrical housing 512 constituted by a central heat exchanger body 524 and upper and lower end plates 516 and 518 respectively. The heat exchanger body 524 is constituted by a plurality of stacked rings of abutting arcuate segments 551 formed of extruded aluminum. Refrigerant passages 534 extend through the arcuate segments. A stainless steel sleeve 535 is secured to the inner surface of the heat exchanger body to define a cylindrical heat exchange surface and protect the heat exchanger body from corrosion and erosion.

A refrigerant inlet header 561 extends the length of the heat exchanger body 524 and communicates with one end of each refrigerant passages 534 in the heat exchanger body. The refrigerant inlet header 561 includes a refrigerant inlet 563 and a plurality of refrigerant outlets 565 each of which is in line with a respective refrigerant passage 534 in the heat exchanger body. A refrigerant outlet header 567 also extends the length of the heat exchanger body and communicates with the opposite end of each refrigerant passage 534 in the heat exchanger body. The refrigerant outlet header 567 includes a plurality of inlets 569 in line with the refrigerant passages 534 in the heat exchanger body and a refrigerant outlet 571.

A drive shaft 580 extends centrally through the housing 512 and is coupled to a motor (not shown). A pair of blades 598 are mounted on the drive shaft 580 via longitudinally spaced, radial extending arms 600. Each blade 598 is notched and is wedge-shaped in plan. The blades 598 contact the heat exchange surface and are rotated at a speed sufficient to inhibit deposition of ice crystals on the heat exchange surface as described previously.

Figure 19A:
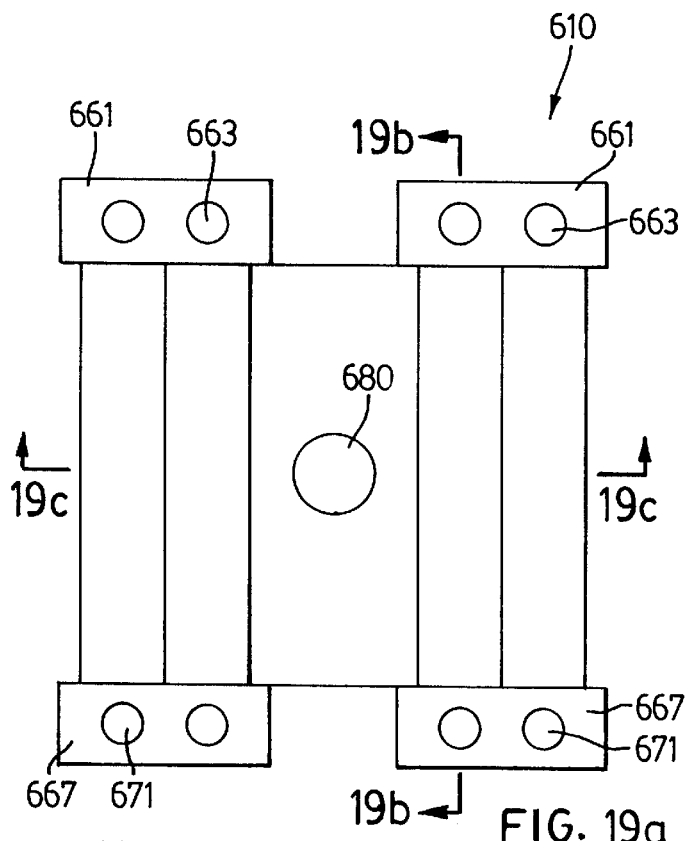
FIGS. 19a, 19b and 19c are front elevational and cross-sectional views of yet another embodiment of an ice-making machine in accordance with the present invention.
Figure 19B:
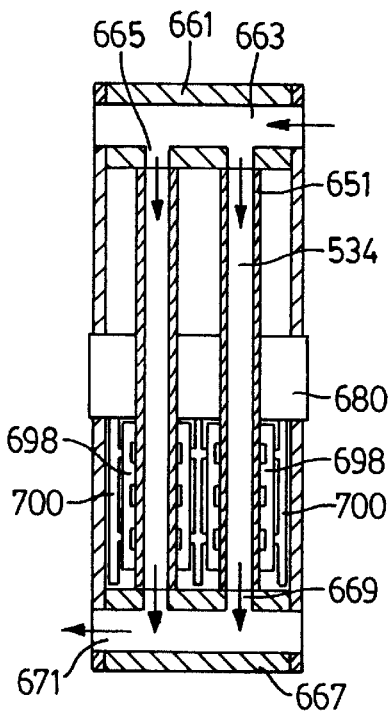
Figure 19C:
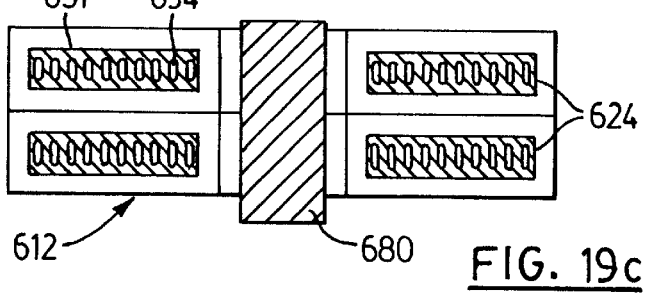

Referring now to FIGS. 19*a* to 19*c*, yet another embodiment of an ice-making machine in accordance with the present invention is shown and is generally indicated to by reference numeral 610. In this embodiment, the housing 612 includes a heat exchanger body 624 constituted by an array of upright rectangular plates 651 formed of extruded aluminum. Refrigerant passages 634 extend vertically through each of the plates. Opposed major sides of the plates are lined with a stainless steel sheet to define heat exchange surfaces and protect the plates from erosion and corrosion. A drive shaft 680 extends centrally through the housing and carries a plurality of blades 698 mounted on arms 700 extending radially from the drive shaft 680 at spaced locations. Each blade 698 is notched and wedge-shaped, and is in contact with a respective one of the heat exchange surfaces. Refrigerant inlet headers 661 are mounted on the top of the rectangular plates 651 and include refrigerant inlets 663 receiving a flow of refrigerant and refrigerant outlets 665 aligned with the refrigerant passages 634 in the rectangular plates 651. Refrigerant outlet headers 667 are mounted on the bottom of the rectangular plates 651 and include refrigerant inlets 669 in line with the refrigerant passages 534 in the rectangular plates and refrigerant outlet headers 671.

Figure 20A:
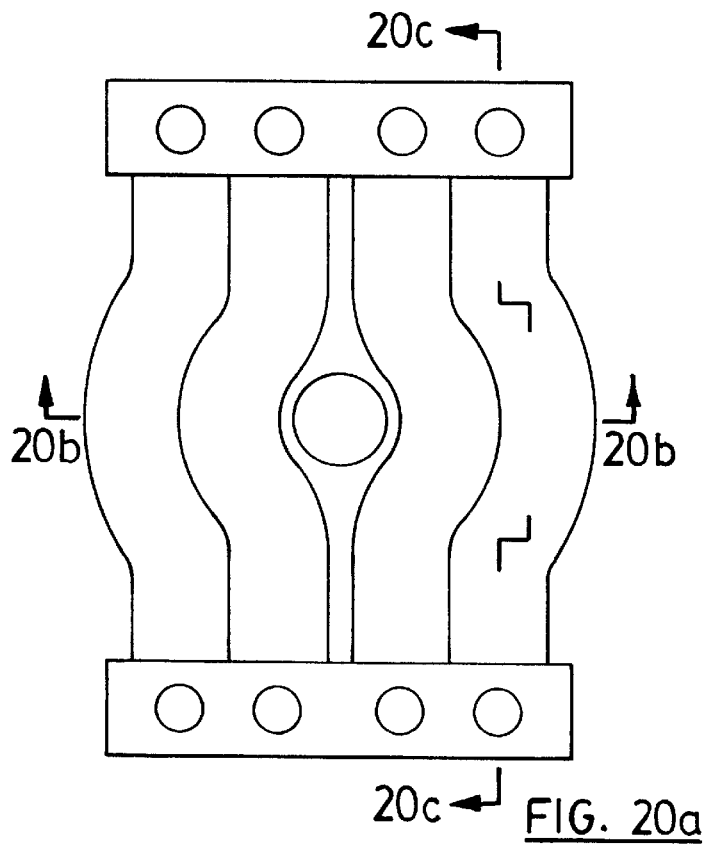
FIGS. 20a, 20b and 20c are front elevational and cross-sectional views of yet another embodiment of an ice-making machine in accordance with the present invention.
Figure 20B:
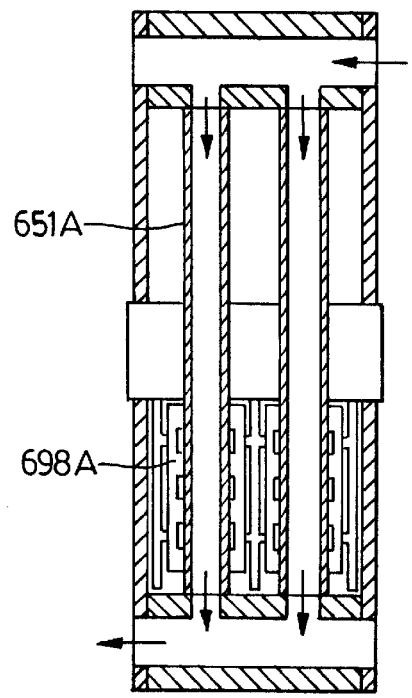
Figure 20C:
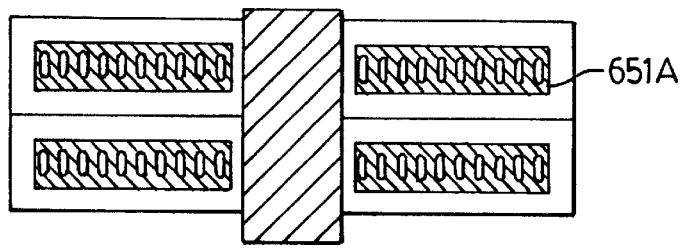

Referring now to FIGS. 20*a* to 20*c*, another embodiment of an ice-making machine similar to that shown in FIGS. 19*a* to 19*c* is illustrated. In this embodiment, the plates 651A defining the heat exchanger body include central curved sections to increase the surface area of the heat exchange surfaces contacted by the rotating blades 698A.

Figure 21A:
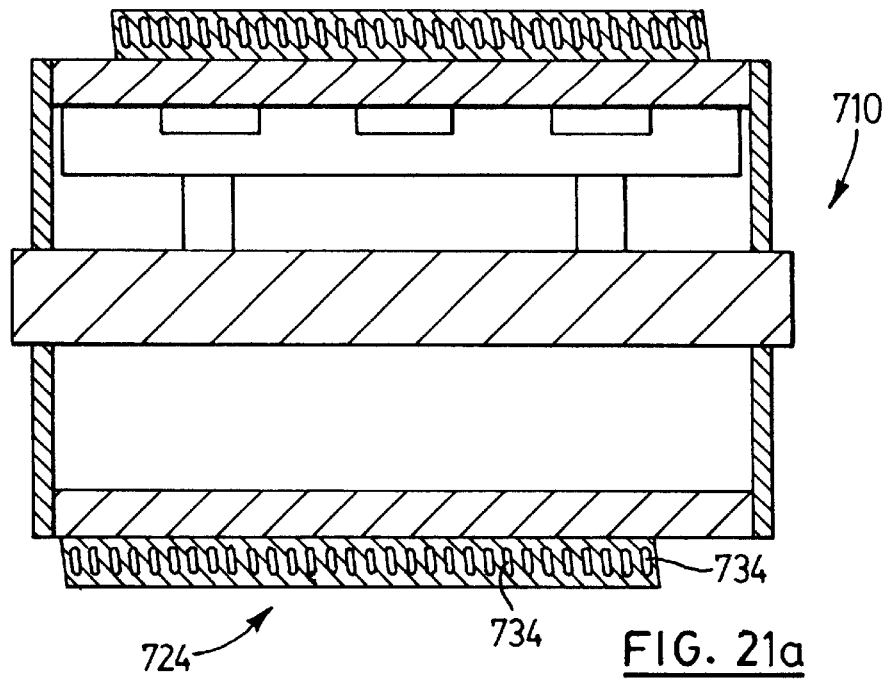
FIG. 21a is a cross-sectional view of yet another embodiment of an ice-making machine in accordance with the present invention.
Figure 21B:
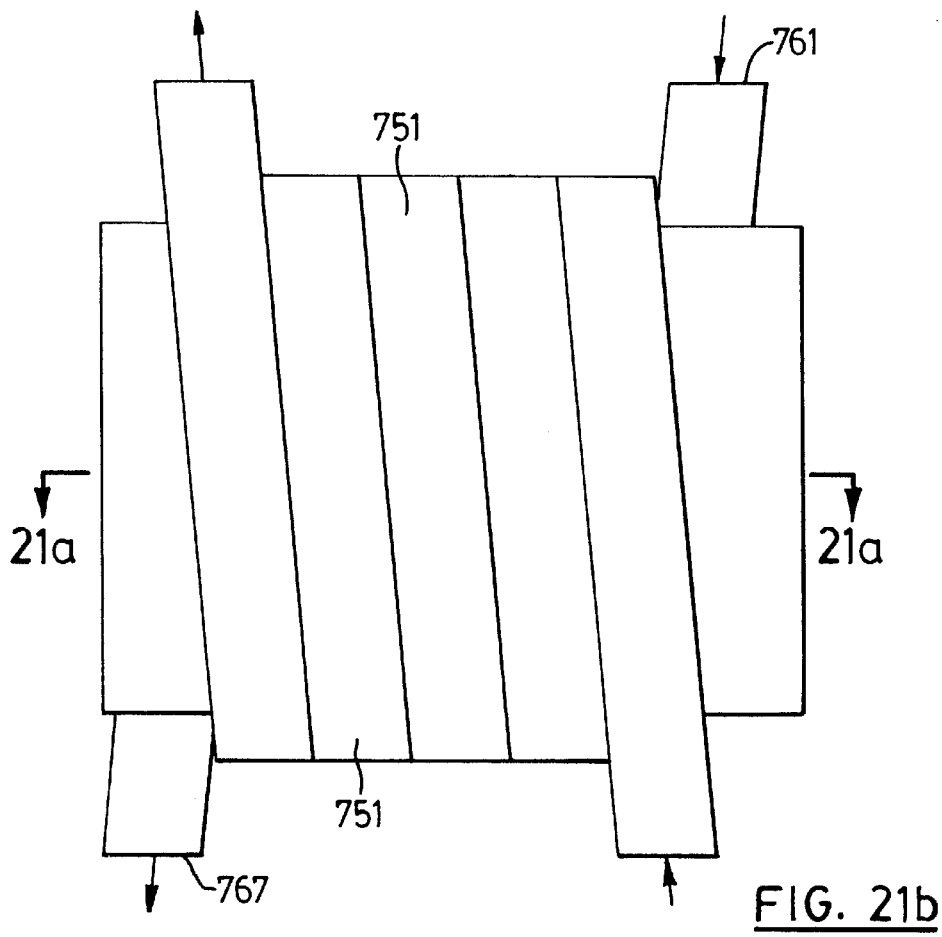

Referring now to FIGS. 21*a* and 21*b* yet another embodiment of an ice-making machine in accordance with the present invention is shown and is generally indicated to by reference numeral 710. In this embodiment, the heat exchanger body 724 is constituted by a thin, elongate rectangular aluminum extrusion 751 having spaced longitudinally extending refrigerant passages 734 therein. The extrusion 751 is wound to form a helix and is lined with a stainless steel tube 735 defining an inner generally cylindrical heat exchange surface. A refrigerant inlet header 761 is coupled to one end of the extrusion to deliver refrigerant to each of the refrigerant passages 734. A refrigerant outlet header 767 is coupled to the other end of the extrusion to collect refrigerant from the refrigerant passages 734.

Figure 22C:
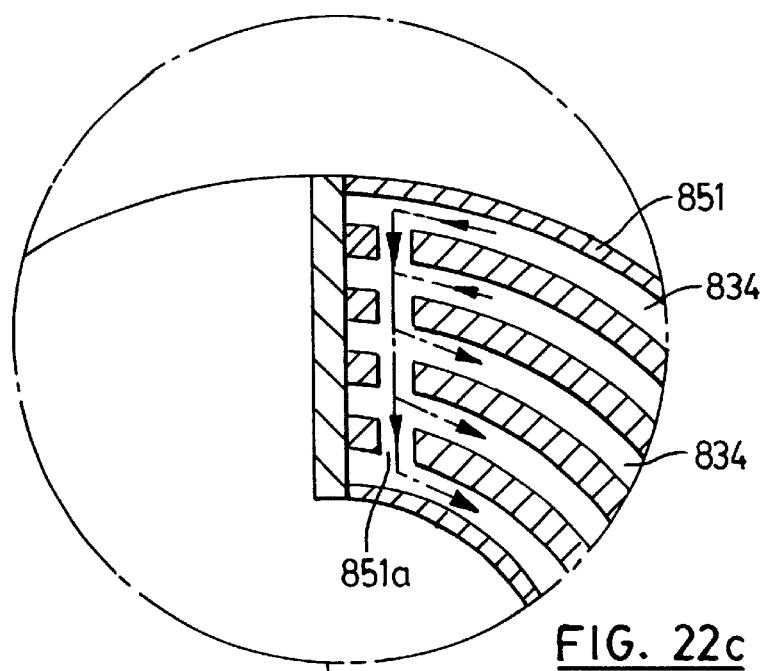
FIG. 22c is an enlarged cross-sectional view of a portion of FIG. 22b.
Figure 22B:
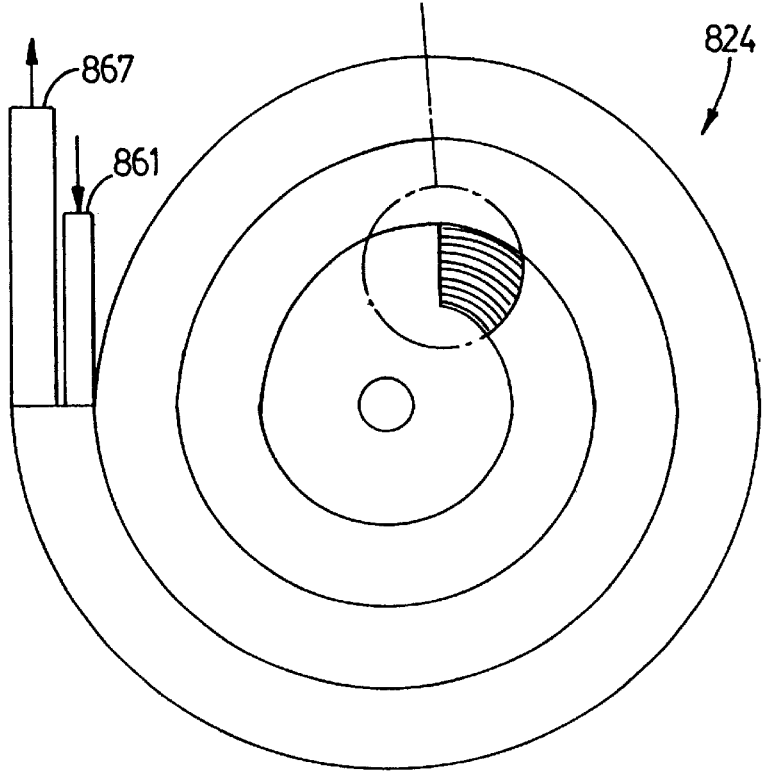
Figure 22A:
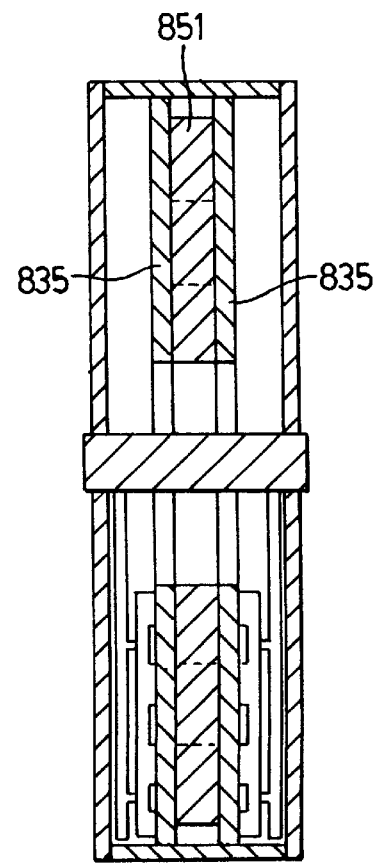
FIG. 22a is a cross-sectional view of yet another embodiment of an ice-making machine in accordance with the present invention.
Figures 24A, 24B:
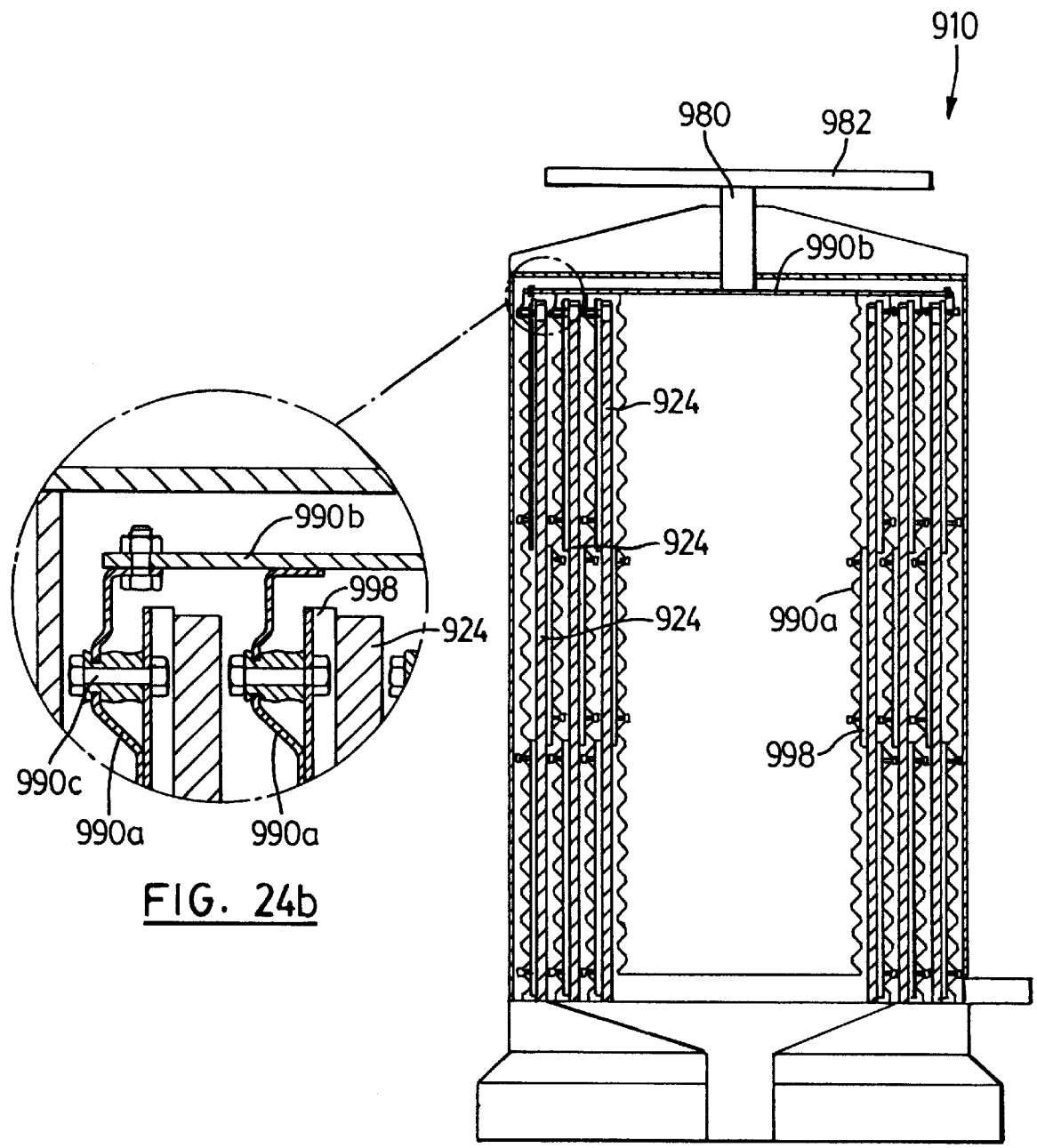
Figure 24E:
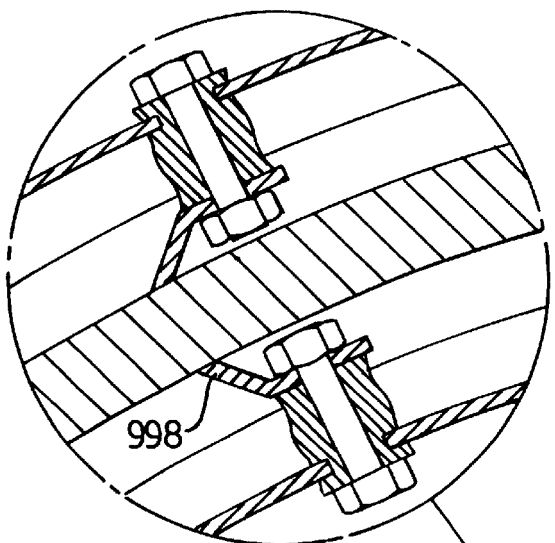
FIG. 24e is an enlarged cross-sectional view of another portion of the heat exchanger body of FIG. 24c.
Figure 24D:
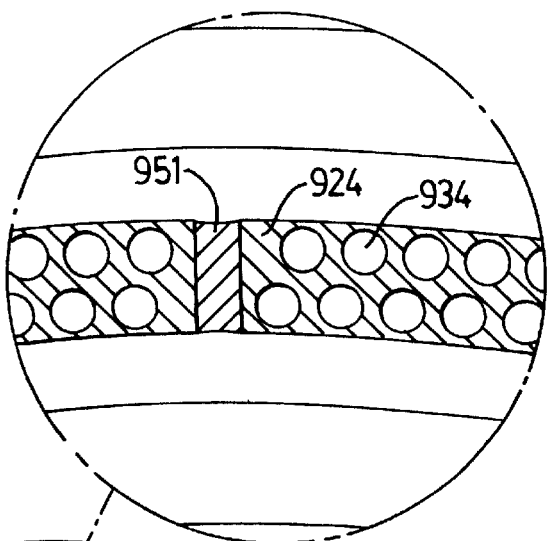
FIG. 24d is an enlarged cross-sectional view of a portion of the heat exchanger body of FIG. 24c.
Figure 24C:
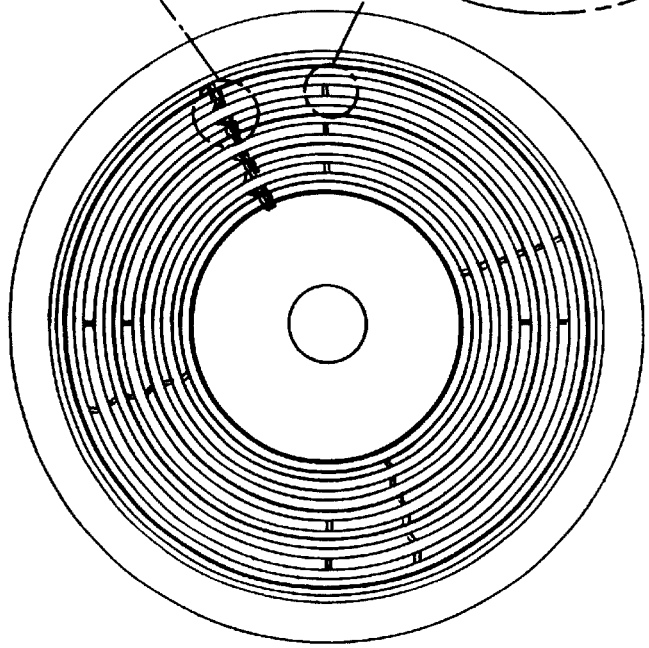

Referring now to FIGS. 22*a* to 22*c*, yet another embodiment of an ice-making machine in accordance with the present invention is shown and is generally indicated to by reference numeral 810. In this embodiment, the heat exchanger body 824 is in the form of a spiral plate 851. Opposed major sides of the plate are covered by stainless steel sheets 835 defining heat exchange surfaces. The spiral plate 851 is constituted by an elongate, thin rectangular extrusion having spaced longitudinally extending refrigerant passages 834 therein that has been wound. The inner end of the spiral plate 851 is sealed and an internal passage 851*a* is formed through the spiral plate to interconnect the refrigerant passages 834 therein (see FIG. 22*c*). Refrigerant inlet and outlet headers 861 and 867 respectively are coupled to the outer end of the spiral plate 851. The refrigerant inlet header 861 communicates with some of the refrigerant passages 834 while the refrigerant outlet header 867 communicates with the remaining refrigerant passages 834. Refrigerant delivered to refrigerant passages 834 through the refrigerant inlet header 861 flows in an inward spiral along the refrigerant passages until it reaches the end of the spiral plate at which time the refrigerant is directed into the other refrigerant passages where it flows back in an outward spiral to the refrigerant outlet header 867.

FIGS. 23*a* and 23*b* show an ice-making machine similar to that shown in FIGS. 22*a* and 22*b*. In this embodiment, the rectangular extrusion is wound in a spiral and then unwound in an adjacent spiral to form side by side spiral plates 851A. The refrigerant inlet header 861A is coupled to one end of the spiral while the refrigerant outlet header 867A is coupled to the other end of the spiral allowing refrigerant to flow through all of the refrigerant passages in the same direction.

Referring now to FIGS. 24*a* to 24*e*, yet another embodiment of an ice-making machine in accordance with the present invention is shown and is generally indicated to by reference numeral 910. In this embodiment, the ice-making machine includes a plurality of concentric cylindrical heat exchanger bodies 924. Each heat exchanger body 924 is formed from a plurality of elongate arcuate segments 951 joined by adhesive 925. Spaced, longitudinally extending refrigerant passages 934 extend through the arcuate segments. The inner and outer surfaces of each heat exchanger body 924 are lined with stainless steel to define heat exchange surfaces.

A blade assembly 990 is associated with each heat exchange surface. Each blade assembly 990 includes an elongate corrugated plate 990*a* depending from a support 990*b* positioned above the heat exchanger bodies. Blades 998 are secured to the corrugated arms 990*a* by fasteners 990*c* and contact a portion of a respective heat exchange surface. The corrugated arms 990*a* positioned between two heat exchanger bodies 924 carry blades 998 which contact heat exchange surfaces of both heat exchanger bodies. The support 990*b* is mounted on the end of a drive shaft 980 which is rotated by a motor 982.

During operation, refrigerant is delivered to the refrigerant passages 934 in the heat exchanger bodies and brine solution is delivered into the ice-making machine so that it contacts each of the heat exchange surfaces of the heat exchanger bodies. The drive shaft 980 is rotated by the motor thereby to import rotation of the support 990*b*. As the support rotates so do the arms 990*a* causing the blades 998 to sweep across the heat exchange surfaces at a rate sufficient to avoid deposition of ice crystals on the heat exchange surfaces.

Since this arrangement provides a plurality of concentric heat exchange surfaces, the capacity of the ice-making machine is significantly increased.

Figure 25A:
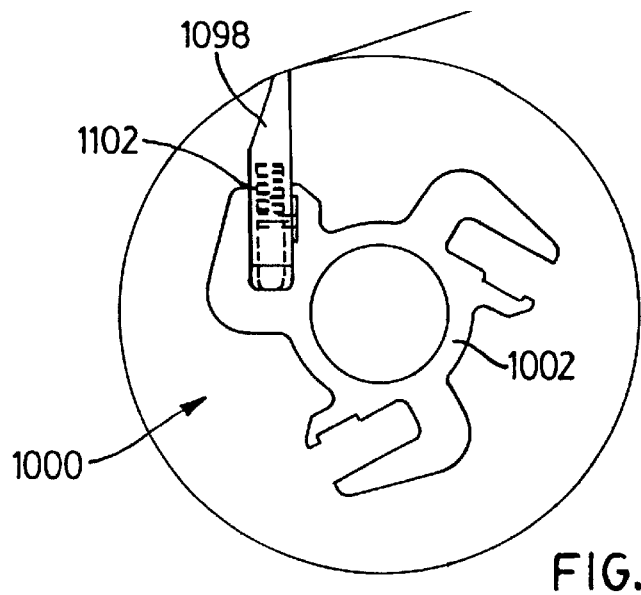
FIG. 25a is an end view partly in section of a blade assembly for an ice-making machine in accordance with the present invention.
Figure 25B:
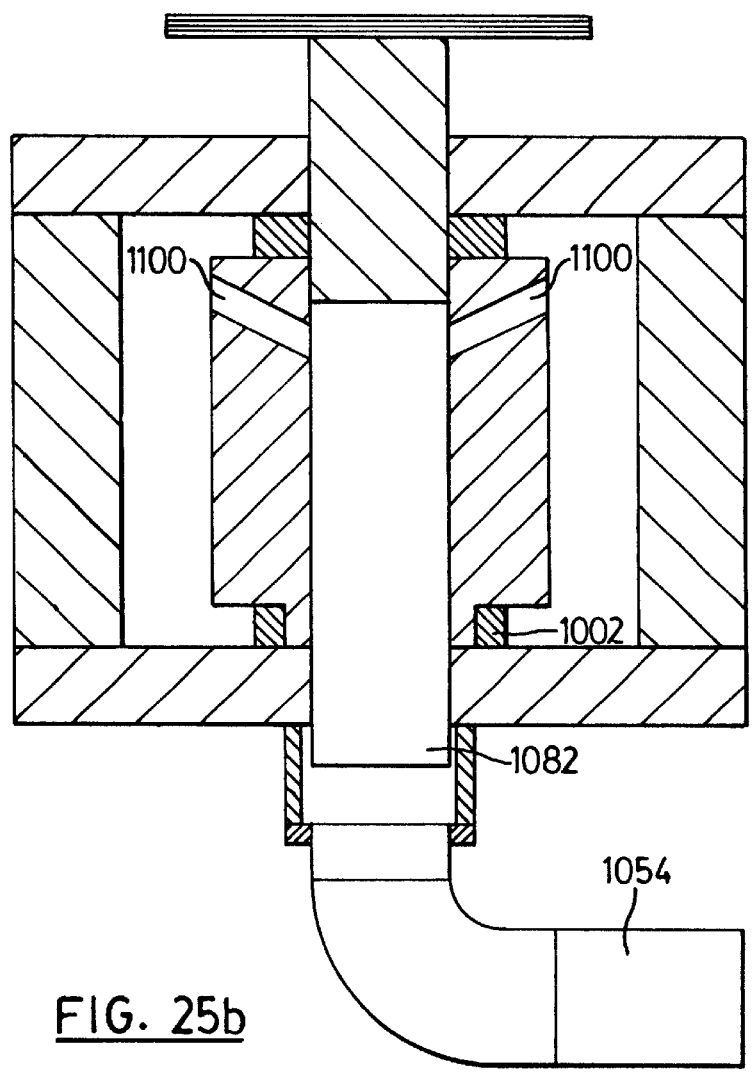

Referring now to FIGS. 25*a* and 25*b*, an alternative embodiment of a blade assembly for an ice-making machine having a single cylindrical heat exchange surface is shown and is generally indicated to by reference numeral 1000. In this embodiment, the blade assembly includes a carrier 1002 surrounding the drive shaft 1082 within the heat exchanger body 1024. Similar to the first embodiment, the drive shaft is hollow and is coupled to a brine solution inlet 1054. Spaced, radially extending passages 1100 extend through the carrier and communicate with the drive shaft to deliver brine solution into the body of the heat exchanger body. The carrier 1002 supports three blades 1098 which contact the heat exchange surface. The blades are oriented such that they form an angle of attack with respect to the tangent of the heat exchange surface equal to approximately 110 degrees.

Springs 1102 are accommodated within the blades 1098 to bias the blades towards the heat exchange surface. The blades are however movable into the carrier should the blades encounter an obstruction on the heat exchange surface when rotating. This inhibits the blades from breaking should an obstruction such as ice form on the heat exchange surface.

Figure 26B:
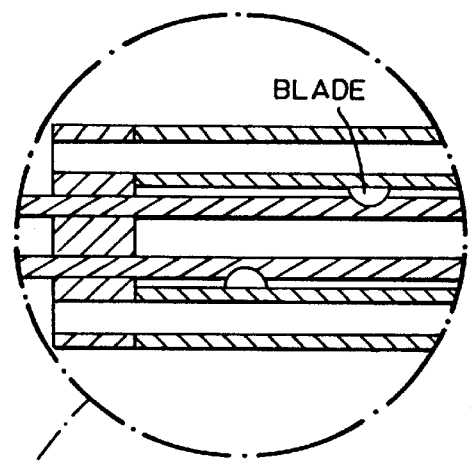
Figure 26A:
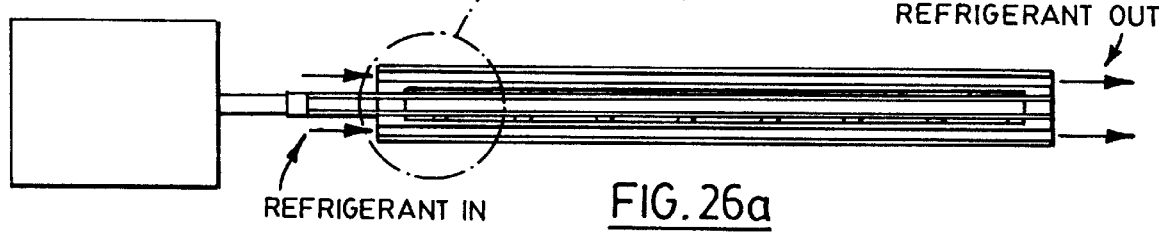
FIG. 26a is a cross-sectional view of yet another embodiment of an ice-making machine in accordance with the present invention.
Figure 26C:
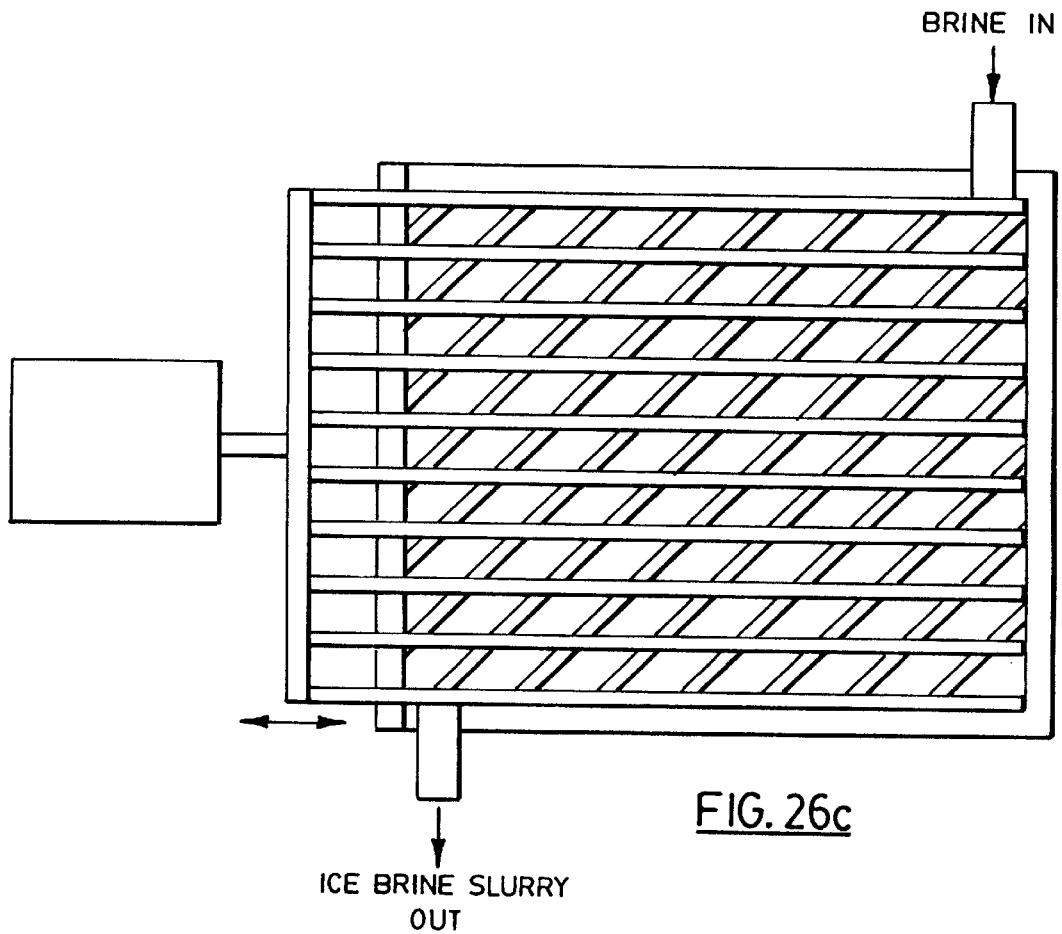

Referring now to FIGS. 26*a* to 26*c*, yet another embodiment of an ice-making machine in accordance with the present invention is shown. In this embodiment, the ice-making machine includes a heat exchanger body constituted by a plurality of thin extruded spaced plates. Spaced refrigerant passages extend through each of the plates. Facing surfaces of the plates are lined with stainless steel to define a pair of heat exchange surfaces. A refrigerant inlet header is secured to one end of the plates to allow refrigerant to be supplied to the heat exchanger body. A refrigerant outlet header is secured to an opposite end of the plates. The inlet and outlet header seal the sides of the heat exchanger body. The sides of the plates are sealed to define a chamber for brine solution. A blade assembly is accommodated within the chamber. The blade assembly includes a frame supporting a plurality of spaced diagonal blades. The blades are semi-circular when viewed from the end. The frame passes through the refrigerant inlet header and is coupled to a drive shaft reciprocated by a motor.

During operation, brine solution is fed into the chamber via a brine inlet and refrigerant is supplied to the refrigerant passages via the refrigerant inlet header. As this is done, the motor is actuated to reciprocate the drive shaft and hence the frame so that the diagonally extending blades oscillate within the chamber and contact the heat exchange surfaces. Supercooled brine solution removed from the heat exchange surfaces crystallizes in the body of solution within the chamber to form ice-brine slurry which exits the ice-making machine via the ice-slurry outlet.

Although specific embodiments of the present invention have been described, those of skill in the art will appreciate that variations and modifications may be made to the present invention without departing from the scope thereof as defined by the appended claims.

I claim:

1. An ice-making machine comprising:

a generally cylindrical, tubular body having a generally cylindrical internal surface, said body being formed of corrodable material;

a plurality of generally parallel refrigerant passages surrounding said internal surface;

end plates at opposite ends of said body;

a refrigerant inlet header delivering refrigerant to a plurality of said refrigerant passages;

a refrigerant outlet header collecting refrigerant having passed through said refrigerant passages;

an inlet delivering fluid from which ice is to be made into said body to permit said refrigerant to extract heat from said fluid;

an outlet permitting the egress of ice from said body;

a protective lining formed from generally non-corrodable material on said internal surface;

at least one blade in contact with said lining, said at least one blade moving about an axis to move across said lining and remove cooled fluid therefrom; and a drive moving said at least one blade across said lining.

2. An ice-making machine as defined in claims wherein said sleeve is a thin plate rolled into a cylinder.

3. An ice-making machine as defined in claim 2 wherein said sleeve is heat shrunk to said body.

4. An ice-making machine as defined in claim 3 wherein said sleeve is formed of stainless steel.

5. An ice-making machine as defined in claim 3 wherein abutting ends of said plate are welded together along the lengths thereof to inhibit said fluid from contacting said body.

6. An ice-making machine as defined in claim 5 wherein said sleeve is glued to said body.

7. An ice-making machine as defined in claim 6 wherein abutting ends of said sleeve are sealed along the lengths thereof by an adhesive.

8. An ice-making machine as defined in claim 7 further including a sealing band running along and extending the length of said adhesive.

9. An ice-making machine as defined in claim 2 wherein the ends of said sleeve overlap and are in sealing engagement.

10. An ice-making machine as defined in claim 1 wherein said lining is a cylindrical sleeve disposed within said body.

* * * * *